US010652259B2

(12) United States Patent
Terada et al.

(10) Patent No.: US 10,652,259 B2
(45) Date of Patent: May 12, 2020

(54) INFORMATION PROCESSING APPARATUS, METHOD AND MEDIUM FOR CLASSIFYING UNAUTHORIZED ACTIVITY

(71) Applicant: PFU LIMITED, Kahoku-shi, Ishikawa (JP)

(72) Inventors: Seigo Terada, Kahoku (JP); Keiji Michine, Kahoku (JP)

(73) Assignee: PFU LIMITED, Kahoku-shi (JP)

( * ) Notice: Subject to any disclaimer, the term of this patent is extended or adjusted under 35 U.S.C. 154(b) by 191 days.

(21) Appl. No.: 15/689,327

(22) Filed: Aug. 29, 2017

(65) Prior Publication Data

US 2018/0332061 A1   Nov. 15, 2018

(30) Foreign Application Priority Data

May 12, 2017 (JP) ................................ 2017-095339

(51) Int. Cl.
*H04L 29/06* (2006.01)
*G06F 21/56* (2013.01)
*G06F 21/55* (2013.01)

(52) U.S. Cl.
CPC ........ *H04L 63/1425* (2013.01); *G06F 21/552* (2013.01); *G06F 21/567* (2013.01); *H04L 63/10* (2013.01); *H04L 63/145* (2013.01); *H04L 63/1408* (2013.01); *H04L 63/1416* (2013.01); *G06F 2221/034* (2013.01)

(58) Field of Classification Search
None
See application file for complete search history.

(56) References Cited

U.S. PATENT DOCUMENTS

| 7,917,647 | B2* | 3/2011 | Cooper | ................. H04L 41/046 370/229 |
| 8,582,567 | B2* | 11/2013 | Kurapati | ........... H04L 29/06027 370/352 |
| 9,565,208 | B2 | 2/2017 | Ibatullin et al. | |
| 9,680,852 | B1* | 6/2017 | Wager | ..................... H04L 63/1416 |
| 10,289,841 | B2* | 5/2019 | Tang | ..................... H04L 41/142 |
| 10,298,607 | B2* | 5/2019 | Tang | ..................... H04L 41/142 |
| 10,419,450 | B2* | 9/2019 | Muddu | ............... H04L 41/0893 |

(Continued)

FOREIGN PATENT DOCUMENTS

| JP | 2008-152773 A | 7/2008 |
| JP | 6097849 B2 | 3/2017 |

(Continued)

*Primary Examiner* — Saleh Najjar
*Assistant Examiner* — Michael W Chao
(74) *Attorney, Agent, or Firm* — Westerman, Hattori, Daniels & Adrian, LLP

(57) ABSTRACT

An information processing apparatus specifies the phase of activity of a terminal connected to a network by comparing a communication by the terminal with a previously held pattern, specifies the type of behavior of the terminal in relation to a first communication and a second communication, by correlation analysis between a first phase specified based on the first communication of the terminal and a second phase specified based on the second communication which is conducted before or after the first communication, and classifies the unauthorized activity of the terminal based on the specified type of behavior when determination is made that the terminal is used to conduct unauthorized activity.

14 Claims, 12 Drawing Sheets

(56) References Cited

U.S. PATENT DOCUMENTS

| | | | |
|---|---|---|---|
| 10,419,462 B2 * | 9/2019 | Muddu | H04L 63/1433 |
| 10,419,463 B2 * | 9/2019 | Muddu | G06K 9/2063 |
| 10,474,674 B2 * | 11/2019 | Marquardt | G06F 16/2477 |
| 10,496,816 B2 * | 12/2019 | Iyer | G06Q 10/105 |
| 10,521,590 B2 * | 12/2019 | Kandala | G06F 21/577 |
| 10,554,686 B2 * | 2/2020 | Ahmed | G06F 21/577 |
| 10,560,468 B2 * | 2/2020 | Muddu | G06F 3/0482 |
| 2005/0283823 A1 * | 12/2005 | Okajo | G06F 21/604 726/1 |
| 2007/0169194 A1 * | 7/2007 | Church | G06F 21/552 726/23 |
| 2008/0060074 A1 * | 3/2008 | Okuyama | H04L 63/1441 726/23 |
| 2008/0147515 A1 | 6/2008 | Abraham et al. | |
| 2011/0138471 A1 * | 6/2011 | Van De Weyer | G06F 21/554 726/25 |
| 2012/0011590 A1 * | 1/2012 | Donovan | H04L 63/1408 726/25 |
| 2015/0200956 A1 | 7/2015 | Koide et al. | |
| 2015/0244732 A1 * | 8/2015 | Golshan | G06F 21/561 726/24 |
| 2016/0226905 A1 * | 8/2016 | Baikalov | H04L 63/1408 |
| 2016/0323304 A1 * | 11/2016 | Terada | H04L 63/1408 |
| 2016/0323305 A1 | 11/2016 | Koide et al. | |
| 2017/0063897 A1 * | 3/2017 | Muddu | G06F 16/254 |
| 2017/0063898 A1 * | 3/2017 | Muddu | G06F 16/254 |
| 2017/0220801 A1 * | 8/2017 | Stockdale | G06F 21/552 |
| 2017/0244740 A1 * | 8/2017 | Mahabir | H04L 63/1433 |
| 2018/0103052 A1 * | 4/2018 | Choudhury | G06F 21/566 |
| 2018/0219894 A1 * | 8/2018 | Crabtree | H04L 63/1425 |
| 2018/0295154 A1 * | 10/2018 | Crabtree | H04L 63/1408 |
| 2018/0316727 A1 * | 11/2018 | Tsironis | H04L 63/20 |
| 2019/0297117 A1 * | 9/2019 | DiGiambattista | H04L 63/1441 |
| 2020/0007561 A1 * | 1/2020 | Muddu | G06F 16/254 |
| 2020/0065340 A1 * | 2/2020 | Hodge | G06F 16/258 |

FOREIGN PATENT DOCUMENTS

| | | | |
|---|---|---|---|
| WO | WO-2015107862 A1 * | 7/2015 | G06F 21/56 |
| WO | 2016/038662 A1 | 3/2016 | |

* cited by examiner

INFORMATION PROCESSING APPARATUS, METHOD AND MEDIUM FOR CLASSIFYING UNAUTHORIZED ACTIVITY

CROSS-REFERENCE TO RELATED APPLICATION

This application is based, upon and claims the benefit of priority of the prior Japanese Patent Application No. JP2017-095339, filed on May 12, 2017, the entire contents of which are incorporated herein by reference.

FIELD

The present disclosure relates to technology for managing terminals connected to a network.

BACKGROUND

In the prior art, a method for determining unauthorized activity has been proposed, in which a communication by a terminal connected to a network is compared with a previously held pattern, an evaluated value indicating an extent to which it is inferred that the terminal is used, to conduct unauthorized activity is specified, together with a phase of unauthorized activity, in accordance with the comparison result, and it is determined whether or not the terminal is used to conduct unauthorized activity, based on a maximum value of the evaluated value for each phase (see the specification of Japanese Patent No. 6097849).

Furthermore, various technologies for detecting an attack on a system and classifying the detected attack have been proposed (see the specifications of U.S. Pat. No. 9,565,208, Japanese Patent Application Publication No. 2008-152773 and WO 2016/038662).

SUMMARY

One example of the present disclosure is an information processing apparatus, including a processor configured to execute: comparing a communication by a terminal connected to a network with a pattern held in advance; specifying a phase of activity of the terminal, in accordance with a result of the comparing; determining whether or not the terminal is used to conduct unauthorized activity; specifying a type of behavior of the terminal in relation to a first communication and a second communication which is carried out before or after the first communication, by analyzing a correlation between a first phase specified based on the first communication of the terminal and a second phase specified based on the second communication; and classification which involves classifying unauthorized activity of the terminal based on the type of behavior specified in the analyzing, when determination is made in the determining that the terminal is used to conduct unauthorized activity.

The present disclosure can be understood as an information processing apparatus, a system, a method executed by a computer, or a program which is executed in a computer.

Furthermore, the present disclosure can also be understood as a recording medium on which such a program is recorded so as to foe readably by a computer, or other apparatus or machine, or the like.

Here, a recording medium which is readable by a computer, or the like, is a recording medium on which information, such as data or programs, is stored by an electrical, magnetic, optical, mechanical or chemical action, and which can be read by the computer, or the like.

DESCRIPTION OF EMBODIMENTS

Below, embodiments of the information processing apparatus and the method and program relating to the present disclosure are described below on the basis of the drawings. However, the embodiments given below are merely examples and the information processing apparatus and the method and program relating to the present disclosure are not limited to the specific configuration given below.

In implementing the disclosure, the concrete configurations corresponding to the embodiments can be adopted, as appropriate, and various improvements and modifications can be made.

In the present embodiment, the information processing apparatus, method and program relating to the present disclosure are described on the basis of an embodiment implemented in a system in which a terminal carrying out an unauthorized activity on a network is discovered and measures such as blocking communications or issuing an alert, etc. are implemented. The information processing apparatus, method and program relating to the present disclosure can be applied widely to technology for classifying unauthorized activity on a network, and the object of application of the disclosure is not limited to the example given in the present embodiment.

<System Configuration>

Figure 1:
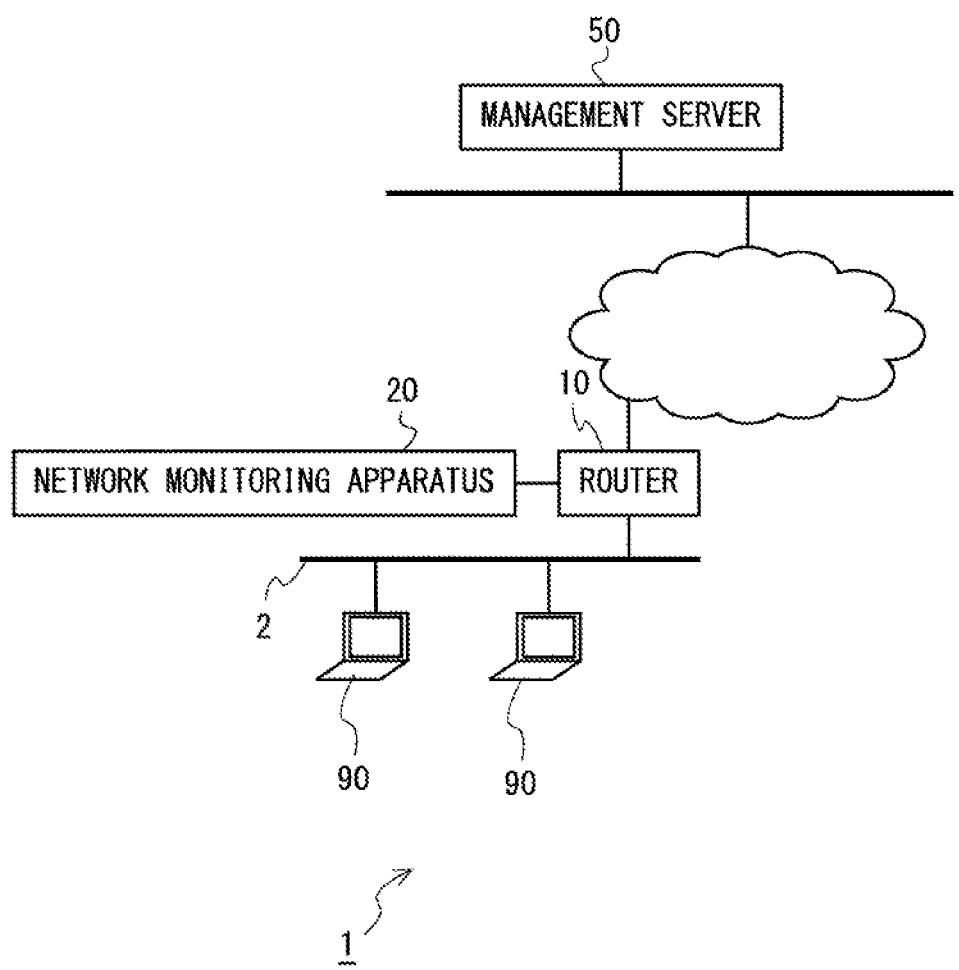
FIG. 1 is a schematic drawing showing a configuration of a system relating to an embodiment or the disclosure.

FIG. 1 is a schematic drawing showing the configuration of a system 1 relating to the present embodiment. The system 1 relating to the present embodiment includes a network segment 2 to which a plurality of information processing terminals 30 (called "nodes 90" below) are connected, and a network monitoring apparatus 20 for monitoring communications relating to the nodes 30. Furthermore, the management server 50 is connected so as to be able to communicate with the network segment 2 via a router 10. In the present embodiment, the network monitoring apparatus 20 acquires packets, and frames, etc. sent and received by the nodes 90, by connecting with a monitoring port (mirror port) of the switch or router (the router in the example shown in FIG. 1). In this case, the network monitoring apparatus 20 operates in a passive mode and does not transfer the acquired packets.

The management server 50 gathers information from the network monitoring apparatus 20 and manages the network monitoring apparatus 20. A quarantine server may also foe provided in the external network, and a quarantine service may be provided to the nodes 90 connected to the network segment 2, and a business server may also be provided and a service for business may be provided to the nodes 90 (not illustrated in the drawings).

In the system 1 relating to the present embodiment, the various servers connected from the nodes 90 are connected remotely via the Internet or a wide-area network, for example, the servers are presented by an application service provider (ASP), but these servers do not necessarily have to be connected remotely. For example, the servers may also be connected to a local network in which the nodes 90 and the network monitoring apparatus 20 are situated.

Figure 2:
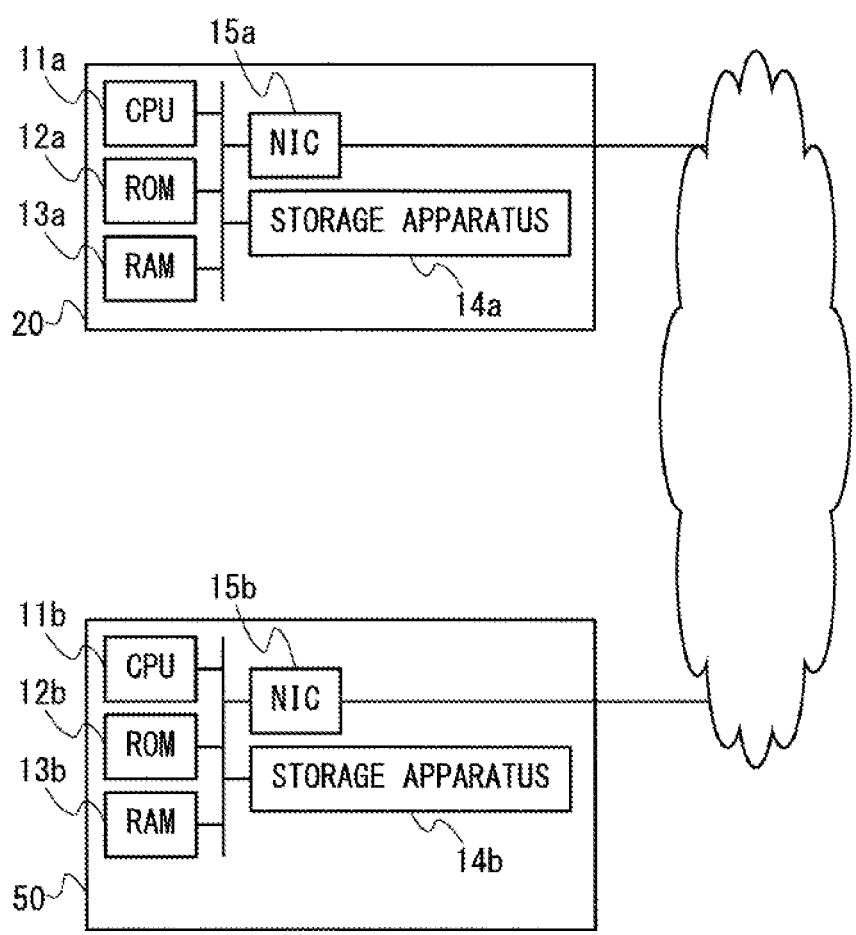
FIG. 2 is a diagram showing a hardware configuration of a network monitoring apparatus and a management server relating to the embodiment.

FIG. 2 is a diagram showing a hardware configuration of a network monitoring apparatus 20 and a management server 50 relating to the present embodiment. In FIG. 2, the configuration apart from the network monitoring apparatus 20 and the management server 50 (namely, the router 10, nodes 90, etc.) is not illustrated. The network monitoring apparatus 20 and the management server 50 are, respectively, computers including a central processing unit (CPU) 11a, 11b, a random access memory (RAM) 13a, 13b, a read only memory (ROM) 12a, 12b, a storage apparatus 14a, 14b, such as an electrically erasable and programmable read only memory (EEPROM) or a hard disk drive (HDD), a communication unit such as a network interface card (MIC) 15a, 15b, and the like.

Figure 3:
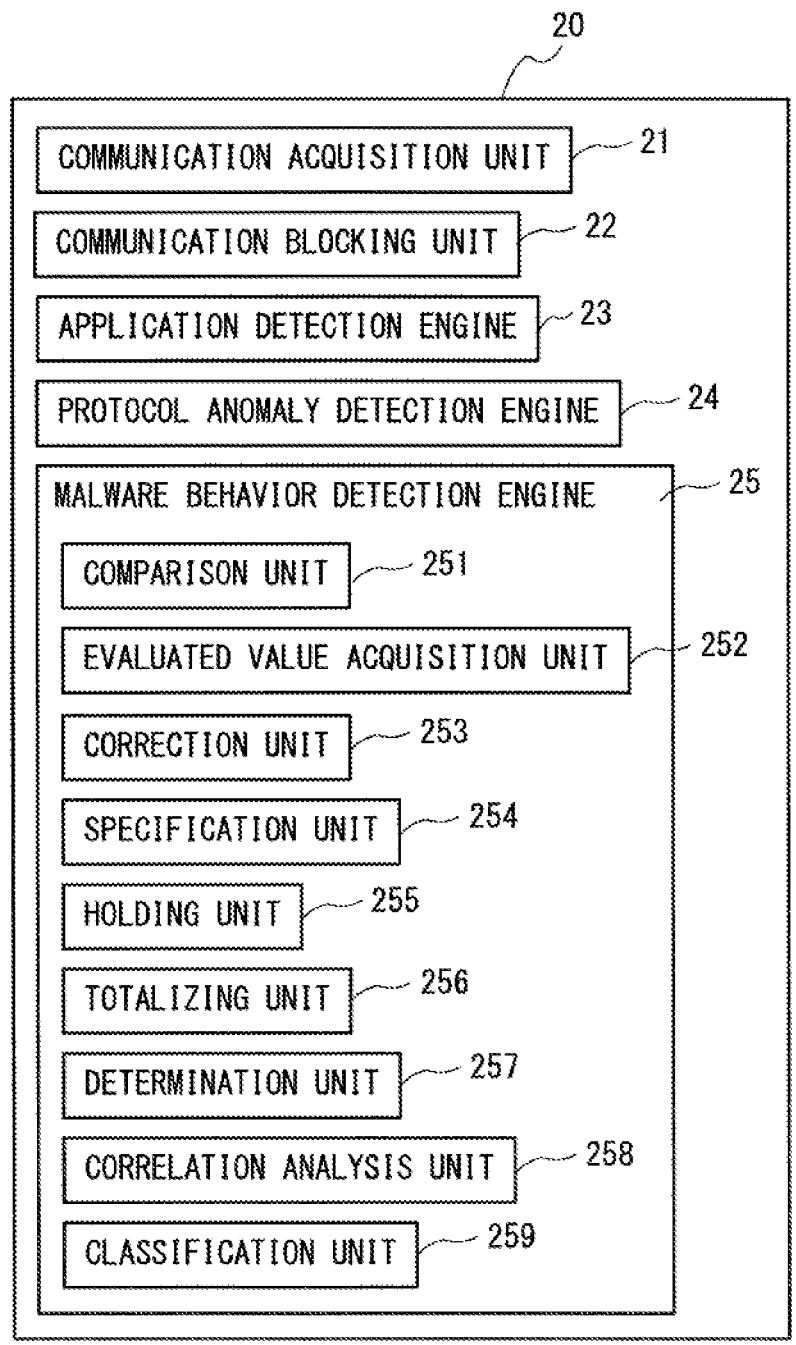
FIG. 3 is a diagram showing a schematic view of the functional configuration of the network monitoring apparatus relating to the embodiment.

FIG. 3 is a diagram showing a schematic view of the functional configuration of a network monitoring apparatus 20 relating to the present embodiment. In FIG. 3, the configuration apart from the network monitoring apparatus 20 (namely, the router 10, nodes 90 and management server 50, etc.) is not illustrated. The network monitoring apparatus 20 functions as an information processing apparatus including a communication acquisition unit 21, a communication blocking unit 22, an application detection engine 23, a protocol anomaly detection engine 24 and a malware behavior detection engine 25, by means of a program recorded in the storage apparatus 14a being read out from the RAM 13a and executed in the CPU 11a. Furthermore, the malware behavior detection engine 25 includes a comparison unit 251, an evaluated value acquisition unit 252, a correction unit 253, a specification unit 254, a holding unit 255, a totalizing unit 256, a determination unit 257, a correlation analysis unit 258 and a classification unit 253. In the present embodiment, the various functions provided in the network monitoring apparatus 20 are executed by the CPU 11a, which is a generic processor, but all or a part of these functions may be executed by one or a plurality of special processors. Furthermore, all or a part of these functions may be executed by a remotely situated apparatus, or a plurality of apparatuses in disperse locations, by using cloud technology, or the like.

The communication acquisition unit 21 acquires communication sent and received by terminals connected to the network. In the present embodiment, a "terminal" which is the object of monitoring and detection by the network monitoring apparatus 20 includes the nodes 90 which are connected to the network segment 2 and other apparatuses (nodes belonging to other networks, external servers, etc.) which communicate with the nodes 90 via the router 10.

The communication blocking unit 22 blocks a communication by a terminal, if it is determined by the application detection engine 23, the protocol anomaly detection engine 24 or the malware behavior detection engine 25 that the terminal in question is used to conduct an unauthorized activity. In the present embodiment, an example is described in which a countermeasure for blocking the communication by the terminal is applied, if it is determined that the terminal in question is used to conduct an unauthorized activity, but the method of the countermeasure adopted when it is determined that a terminal is used to conduct an unauthorized activity is not limited to blocking of the communication. Upon determining that a terminal is used to conduct an unauthorized activity, the network monitoring apparatus 20 may issue an alert (warning) or implement a cure (for example, removal of malware, elimination of vulnerabilities) in the terminal conducting the unauthorized activity.

The application detection engine 23 is an engine which detects when an application, which is used by malware and is not required for business, is carrying out communication on the network; for example, the application detection engine 23 detects that an application not required for business is running on a node 90 by detecting communication based on the known remote access Trojan (RAT), peer-to-peer (P2P) applications, the onion router (Tor), UltraSurf (Proxy tool) and anonymous proxies, etc.

The protocol anomaly detection engine 24 is an engine which detects communication that does not follow protocols on the network, for example, an HTTP anomaly detection engine, an SSL/TLS anomaly detection engine or a DNS anomaly detection engine, or the like. By detecting a communication that does not follow these protocols, the protocol anomaly detection engine 24 detects a node 90 which is used to conduct a communication that does not observe the protocols on the network.

The malware behavior detection engine 25 evaluates the communality between a communication on the network, and a "communication pattern characteristic of malware", for each phase of unauthorized activity by malware, these phases being defined in a malware activity transition model, analyzes malware behavior by monitoring the state of transitions between phases of malware activity, and thereby detects malware infection in a node 90.

Figure 4:
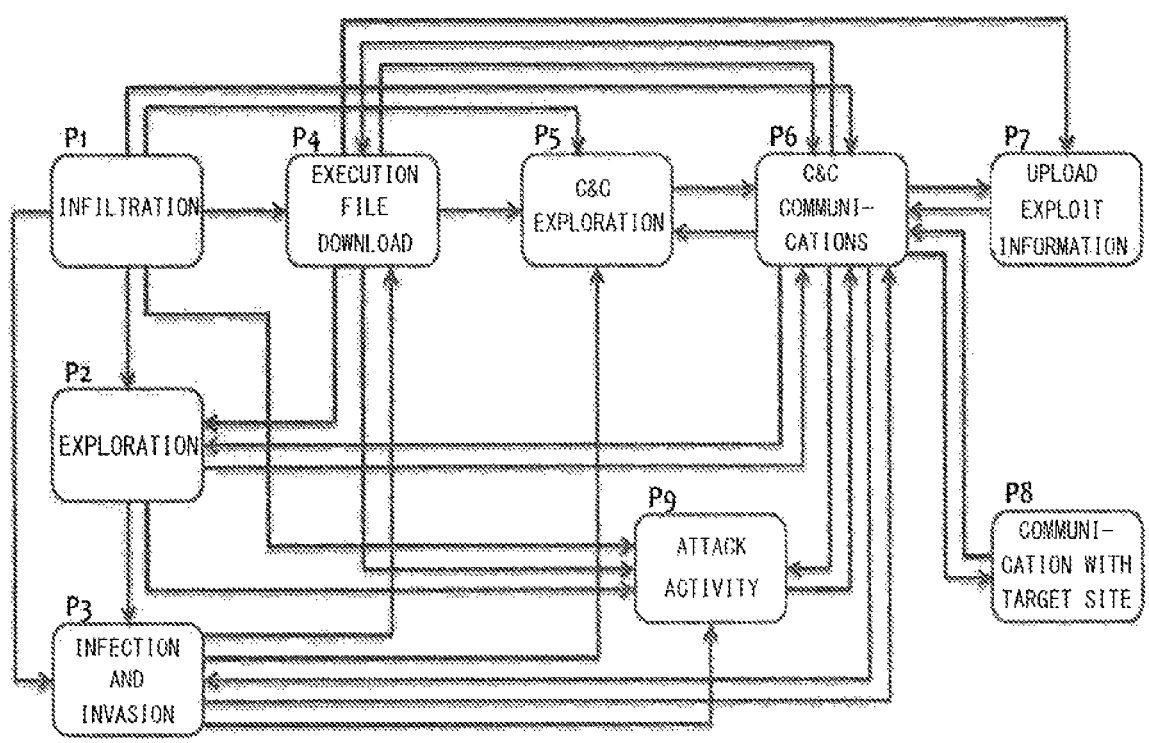
FIG. 4 is a diagram showing a model of malware activity transitions, which is used by a malware behavior detection engine according to the embodiment.

FIG. 4 is a diagram showing a model of malware activity transitions, which is used by the malware behavior detection engine 25 of the present embodiment. Phase P1 to phase P9 are defined in the malware activity transition model shown in the present embodiment, but this is one example used in the present embodiment and the malware activity transition model may be modified, as appropriate, in accordance with the embodiment. Below, each phase in the malware activity transition model relating to the present embodiment will be described.

Phase P1 is an infiltration phase, in other words, a phase where infecting malicious content (malicious code, attack code, exploit code, etc.) is downloaded by utilizing a vulnerability in the OS or applications, when, for instance, a file attachment or an e-mail URL in a targeted e-mail attack is clicked, or a URL on a web site (mainly, an SNS site) is clicked, and so on. The transition destination from phase P1 is either phase P2, phase P4 or phase P9 in the case of an autonomous malware infiltration, such as a worm, and is either phase P2 or phase P4 in the case of bot-type malware.

Phase P2 is an exploration phase, in other words, a phase of exploring an infected terminal which has a vulnerability.

Phase P3 is an infection and invasion phase (diffusion phase), in other words, a phase of targeting the vulnerability to introduce an exploit code to infect the terminal, or causing an exploit code to be introduced from another terminal to infect the terminal. In the infection and invasion phase, an exploit code is introduced into the targeted terminal via an already infected terminal, and the terminal into which the exploit code has been introduced becomes infected with the malware. For example, a diffusion activity is performed by utilizing an MS-RPC or file sharing vulnerability in the Windows OS. In the case of bot-type malware, an infection activity (malware diffusion activity) is executed based on a command issued by an attacker (herder) via a command and control (C&C) server (phase P6). The transition destination from phase P3 is either phase P4 or phase P9 in the case of autonomous malware, such as a worm, and phase P4 in the case of bot-type malware. The infection and invasion phase has two aspects. One is a phase in which an infecting terminal executes an infection activity. Another aspect is a phase in which an exploit code is introduced to infect a victim (infection target) terminal.

Phase P4 is an execution file download phase, in other words, a phase in which, after introduction of the exploit code, the execution file, which is the actual malware in itself, is downloaded and activated from a malware delivery site or from an already infected terminal, or new malware is downloaded from a site designated by a command from the attacker (via a C&C server), with the object of avoiding detection of the malware by anti-virus products and/or adding new functions, and so on. The HTTP, FTP or TFTP protocol are used principally for downloading the malware in itself. Furthermore, a protocol that is unique to the malware may also be used. The transition destination from phase P4 is either phase P5 or phase P6 in the case of remote-controlled malware, such as a bot, and is generally phase P2 or phase P9 in the case of autonomous malware, such as a worm.

Phase P5 is a C&C exploration phase, in other words, a phase of exploring the C&C server in order to receive a command from an attacker. Malware which transfers to this phase is principally remote-controlled malware, such as a bot. Generally, the FQDN of a plurality of C&C servers are incorporated into malware and a DNS query is used to resolve the address. In the case of a P2P-type botnet, a P2P protocol (generic or unique protocol) is used to search for the C&C node. Malware of a type which has a hard-coded IP address is not active in this phase. The transfer destination from phase P5 is phase P6.

The phase P6 is a C&C communication phase (including Internet connection check), in other words, a phase in which data is sent and received in connection with the C&C server, in order to receive commands from the attacker and to report the command execution results (respond), and the like. There also exists malware which checks the Internet connection before connecting to the C&C server. In the connection to the C&C server, any of the IP addresses which were successfully resolved in phase P5 or any of the IP addresses which are hard-coded in the malware are used.

When a command is received from the C&C server, the malware activity transfers from phase P6 to phase P2, phase P4, phase P8, or phase P9, in accordance with the commands from the attacker. The execution results are reported to the attacker via the C&C server. On the other hand, if the malware fails to connect to the C&C server, then the malware retries connection with another IP address, and if this fails also, then the malware returns to phase P5 and either searches for another C&C server or stops activity. The existence of malware which repeatedly and endlessly reconnects until the connection is successful is also reported. Furthermore, if an abnormality occurs in the C&C communication path and recovery is not possible, then the malware activity transfers to phase P5. Moreover, there is also malware which performs an operation of changing the C&C server at prescribed time intervals, and in this case, the malware activity transfers to phase P5. Furthermore, phase P6 includes a phase of waiting for an instruction from the attacker. The malware periodically accesses the C&C server to maintain the communication path, and also waits for a command from the attacker. There is also malware which performs an operation of changing the C&C server at prescribed time intervals, and in this case, the malware activity transfers to phase P5.

Phase P7 is an exploit information upload phase, in other words, a phase in which information obtained by the activity of the malware, etc. is uploaded to a server, or the like, on the attacker side.

Phase P8 is a target site communication phase, in other words, a phase in which a terminal infiltrated with malware communicates with a target site. For example, a phase in which a terminal which has been infiltrated by "malware conducting unauthorized activity between the terminal and a target site" is carrying out communications with the target site, such as a "Man in the Browser" (MITB) attack or a "Man in the Middle" (MITM) attack, corresponds to phase P8. In an attack of this kind, communications between the terminal and the target side are hijacked by the attacker and the activity phase transfers from phase P8 to phase P6.

Phase P9 is an attack activity phase, in other words, a phase in which various attack activities are carried out in accordance with a command from the attacker (bot type) or the exploit code (worm type) which is incorporated into the malware. Activity corresponding to phase P1 may be carried out in order to find an attack target. Attack activities include: DoS attacks, spam mail attacks, Web attacks (Web falsification), stepping stones, etc.

The malware behavior detection engine 25 has a comparison unit 251, an evaluated value acquisition unit 252, a correction unit 253, a specification unit 254, a holding unit 255, a totalizing unit 256, a determination unit 257, the correlation analysis unit 258 and the classification unit 259 (see FIG. 3) and hence the malware behavior detection engine 25 monitors the transitional states between the phases of malware activity which are defined as described above, and detects a malware infection in the nodes 90. Below, the respective functional units of the malware behavior detection engine 25 will be described.

The comparison unit 251 compares communication newly acquired by the communication acquisition unit 21 (packets, which have been newly acquired and become the object of processing; hereinafter, called "input packets"), with previously held communication patterns. Peculiar communication patterns which appear as a result of various malware activities are previously defined in the held communication patterns. In the present embodiment, a plurality of communication patterns are defined in advance for each of the phases of the malware activity transition model, and are held in the network monitoring apparatus 20 or the management server. A communication pattern relating to phase Pn (here, n is an integer from 1 to 9) is expressed as "Pn–m" (where m is number equal to or greater than 1). It should be noted that there are also communication patterns which are not dependent on any of the phases (in other words, which may appear in a plurality of different phases). In the present embodiment, a communication pattern which is not dependent on any of the phases P1 to P9 is expressed as "P0-m".

As a result of the comparison by the comparison unit 251, the evaluated value acquisition unit 252 acquires a grade for the input packet, in the form of a grade (evaluated value) which is previously set in respect of a communication pattern which matches or approximates the input packet (such a packet is referred to simply as a "corresponding" communication pattern below). The grade (Gr) is a value which indicates the "extent to which the terminal is inferred to be carrying out unauthorized activity (malware activity)", and which is assigned to the individual communication patterns. In the present embodiment, the grade (Gr) is in the range of $0 \leq Gr < 1.0$ (fraction to one decimal point). Grade (Gr)=0 indicates the lowest, possibility of the communication pattern occurring as a result of malware activity, and the closer the value of the grade to 1, the higher the possibility that the communication pattern has occurred as a result of malware activity. The grade (Gr) is specified in advance for each communication pattern, on the basis of the frequency of appearance as a communication pattern in a normal application. In other words, a grade of a higher value is assigned to a communication which has a low possibility of appearing as a communication resulting from an authorized application, and a lower grade is assigned to a communication which has a high possibility of appearing as a communication resulting from an authorized application. In the present embodiment, a grade set in advance for the communication pattern Pn-m is expressed as "Gr(Pn-m)" and a grade assigned to a terminal (h) which carries out the communication in question is expressed as "Gr(h,Pn-m)".

Even with the same communication pattern, different grades (Gr) are assigned based on the conditions. For example, if two conditions associated with a communication pattern "A: destination does not match a C&C server" and "B: destination matches one C&C server" are set, then the conditions are determined as indicated below, and different grades are assigned depending on whether or not the destination matches a registered C&C server.
IF (Pn-m=TRUE) AND (A) THEN Gr(Pn-m)=0.1, ACTION=register in C&C server candidate list
IF (Pn-m=TRUE) AND (B) THEN Gr(Pn-m)=0.6, ACTION=No Moreover, in the present embodiment, the evaluated value acquisition unit 252 acquires a grade in accordance with the results of a correlation analysis between the input packet, and other packets sent or received before or after the input packet by a terminal relating to the input packet (called "preceding packets" and "subsequent packets" below). More specifically, in the present embodiment, the evaluated value acquisition unit 252 determines whether or not there is continuity between a phase acquired in respect of a communication (input packet) acquired by the communication acquisition unit 21 and a phase acquired in respect of another communication (preceding packet or subsequent packet) carried out before or after the communication in question, in respect of the terminal relating to the communication in question, and acquires a grade if it is determined that there is continuity.

The correction unit 253 corrects the grade acquired by the evaluated value acquisition unit 252, in accordance with the results of a correlation analysis between the input packet and the preceding packet or subsequent packet. More specifically, in the present embodiment, the correction unit 253 determines whether or not there is continuity between a phase acquired in respect of a communication (input packet) acquired by the communication acquisition unit 21 and a phase acquired in respect of another communication (preceding packet or subsequent packet) carried out before or after the communication in question, in respect of the terminal relating to the communication in question, and corrects the grade acquired by the evaluated value acquisition unit 252 so as to be larger, if it is determined that there is continuity, compared to when it is determined that there is no continuity.

In other words, in the present embodiment, by means of the evaluated value acquisition unit 252 and the correction unit 253, a correlation analysis is carried out between a newly acquired communication, (input packet) and a past or future communication (preceding packet or subsequent packet) by the terminal relating to the communication in question, and if it is considered that there is "continuity of a kind which raises the extent to which the communication is inferred to be malware activity", between the input packet and the preceding packet or subsequent packet, then the grade corresponding to the past or future communication (preceding packet or subsequent packet) is acquired, and the grade corresponding to the newly acquired communication (input packet) is corrected.

The specification unit 254 specifies the phase and grade relating to the terminal in question, in respect of the input packet. The specification unit 254 specifies the phase Pn which is set in advance in respect of the communication pattern Pn-m corresponding to the input packet, based on the comparison by the comparison unit 251, to be the phase relating to the terminal in question. Furthermore, the specification unit 254 may specify the grade Gr (Pn-m) acquired by the evaluated value acquisition unit 252, directly, as the grade for the input packet, but if the grade is corrected by the correction unit 253, then the specification unit 254 specifies the corrected value as the grade for the input packet.

The holding unit 255 holds the maximum values of the specified grades for each phase, for each of the terminals. In the present embodiment, for each phase Pn of the malware activity transition model, the holding unit 255 holds the maximum value of the grade Gr(Pn-m) for the communication pattern Pn-m detected in respect of the phase Pn in question, as the grade for the phase Pn, and expresses same as "PGr(Pn)". The grade for the phase Pn in the terminal (h) is expressed as "PGr(h,Pn)" and is acquired by the following equation.

$$PGr(h,Pn) = \max\{Gr(Pn\text{-}m) | Pn\text{-}m \in h\}$$

In the present embodiment, the holding unit 255 uses a grade management table holding the maximum grade value for each phase, and each terminal, to manage the grade of each phase, in each terminal (not illustrated). A grade PGr(h,Pn) for each phase Pn is held in the grade management table, for each of the terminals (h) identified by the network monitoring apparatus 20. As described above, the grade PGr(h,Pn) for each phase Pn is the maximum value of the grades Gr(Pn-m) for the detected communication patterns Pn-m in respect of the phase Pn in question. Therefore, when a new grade is specified in respect of any phase, the grade PGr(h,Pn) held in the grade management table is compared with the newly specified grade and updated to the maximum value. The maximum value Gr(h,Pn-m) of the grade Gr(Pn-m) for each communication pattern Pn-m is also held in the storage apparatus 14*a*.

The totalizing unit 256 acquires the maximum values PGr(h,Pn) of the grades of the respective phases from phase P1 to phase P9, for each terminal, and totalizes these maximum values.

The determination unit 257 determines whether or not the terminal is carrying out unauthorized activity, based on the maximum values PGr(h,Pn) of the grades for each phase, in the terminal (h) that is the processing object. In the present embodiment, the determination unit 257 determines whether or not the terminal is carrying out unauthorized activity on the basis of the total value obtained by the totalizing unit 256. More specifically, the determination unit 257 applies a prescribed weighting to the total value, to calculate a "value indicating the degree of possibility of activity by malware" (called "possibility of malware activity" below), and if this value exceeds a prescribed threshold value, then the determination unit 257 determines that the terminal in question is carrying out unauthorized activity. The possibility of malware activity for the terminal (h) indicates the degree of possibility that the terminal (h) is infected by malware, and is expressed as "IR(h)". The possibility of malware activity for the terminal (h) takes a value between 0 (no infection) to 100 (high possibility of infection). In other words, in the present embodiment, the possibility of malware activity for the terminal (h) is defined as indicated below. Here, $\psi$ indicates the malware activity coefficient.

$$IR(h)=\min((\varphi\Sigma_{n=1}^{9}PGr(h,Pn)),1)\times 100$$

In general, a terminal in which communication patterns are detected in a large number of (continuous) phases in the activity transition model can be determined as having a higher possibility of being infected with malware, than a terminal in which communication patterns are detected in a small number of phases, and therefore a malware activity coefficient $\psi$ is introduced (in the present embodiment, the coefficient is set specifically to a value of 0.5). The possibility of malware activity IR(h) described above is calculated and updated each time a communication pattern corresponding to the communication patterns relating to the terminal (h) is detected.

In the present embodiment, a terminal having a possibility of malware activity of 0 to 49 is defined as a "clean terminal", a terminal having a possibility of malware activity of 50 to 89 is defined as a "grey terminal", and a terminal having a possibility of malware activity of 90 to 100 is defined as a "black terminal". The possibility of malware activity and the definition "clean", "grey" or "black" is displayed for each terminal, as a real-time report information, on a management screen (device list screen) of an administrator terminal. Furthermore, an overview of the detected "communication patterns" and a list indicating the number of times each pattern has been detected is displayed for each terminal, as detailed information. The threshold values of the "clean", "grey" and "black" definitions relating to the possibility of malware activity may be set by the administrator.

The correlation analysis unit 258 analyses the correlation between an input packet and other packets (preceding packets or subsequent packets) which are sent or received before or after the input packet by a terminal relating to the input packet. More specifically, the correlation analysis which is carried out in the present embodiment involves analyzing the presence or extent of correlation, such as continuity or communality, etc., between two or more communications, or between two or more phases, and the result of correlation analysis is used by the evaluated value acquisition unit 252, the correction unit 253, the determination unit 257 and a classification unit 259.

More specifically, in the present embodiment, the correlation analysis unit 258 specifies the type of behavior of the terminal in relation to a first communication and a second communication, by analyzing the correlation between a first phase specified on the basis of the first communication of the terminal and a second phase specified on the basis of the second communication which is carried out before or after the first communication. If the first phase and the second phase meet a previously established correlation condition, then the correlation analysis unit 258 specifies the type of behavior corresponding to the correlation condition as the type of behavior of the terminal. For example, the correlation analysis unit 258, by carrying out correlation analysis between a first communication that is determined to be in the infiltration phase P1, and a second communication that is determined to be in an execution file download phase, by means of the specification unit 254, determines the presence or the extent of a correlation between the download of content by the first communication and the download of an execution file by the second communication.

When it has been determined by the determination unit 257 that the terminal is conducting unauthorized activity, the classification unit 259 classifies the unauthorized activity of the terminal on the basis of the one or plurality of types of behavior that have been specified for each terminal. More specifically, the classification unit 259 classifies the unauthorized activity of the terminal by referring to information (for example, a map) that indicates correspondences between classifications of unauthorized activity and the one or plurality of types of behavior related to the unauthorized activity.

In this respect, the classification specified by the classification unit 259 may be a classification indicating a degree of danger of the unauthorized activity, or may be a classification indicating the type of malware relating to the unauthorized activity. If the specified classification is the degree of danger of the unauthorized activity, then the classification unit 259 specifies the degree of danger of the unauthorized activity on the basis of the one or plurality of types of behavior specified in respect of the terminal. If the specified classification is the type of malware relating to the unauthorized activity, then the classification unit 259 specifies the type of malware relating to the unauthorized activity on the basis of the one or plurality of types of behavior specified in respect of the terminal. When classifying the degree of danger, the classification unit 259 desirably investigates in order from the behavior related to the highest degree of danger, and sets the first matching degree of danger.

The classification unit 259 may also be configured so as not to perform classification if the possibility of malware activity calculated by the totalizing unit 256 is less than a prescribed value (for example, 80). In this case, a value indicating "Unclassified" is set in the field where the value indicating the classification is set.

<Flow of Processing>

Next, the flow of processing executed by the system 1 relating to the present embodiment will be described with reference to a flowchart. The specific contents of the processing and the processing sequence indicated in the flowchart described below are examples for implementing the present disclosure. The specific contents of the processing and the processing sequence may be selected, as appropriate, in accordance with the mode of implementing the present disclosure.

When the network monitoring apparatus 20 is connected to a new network, before starting a detection process for each packet as described below, the network monitoring apparatus 20 executes a network configuration analysis/learning process, as preliminary processing. More specifically, when connected to a new network, the network monitoring apparatus 20 acquires packets for a prescribed period of time, and by analyzing the acquired packets, analyzes the configuration of the network that is the object of monitoring, learns the information required for malware detection (a device list (device types, OS types, MAC/IP addresses, etc.), the address system of the network that is the object of monitoring, the DNS server information, mail server information proxy (HTTP/SOCKS) information, Active Directory information, etc.), and stores same in the storage apparatus 14a, or the like.

The network configuration analysis/learning process is executed by the network monitoring apparatus 20 continuously from the detection process described below has started. In other words, the network monitoring apparatus 20 compares the information obtained by analyzing the acquired packets with information learnt by the abovementioned analysis/learning process, and held in the storage apparatus 14a of the network monitoring apparatus 20, and if, as a result of this comparison, the newly obtained information is different from the held information, then the network monitoring apparatus 20 determines that the configuration in the network segment 2 has changed, and uses the newly obtained information to update the information held in the storage apparatus 14a of the network monitoring apparatus 20.

Figure 5:
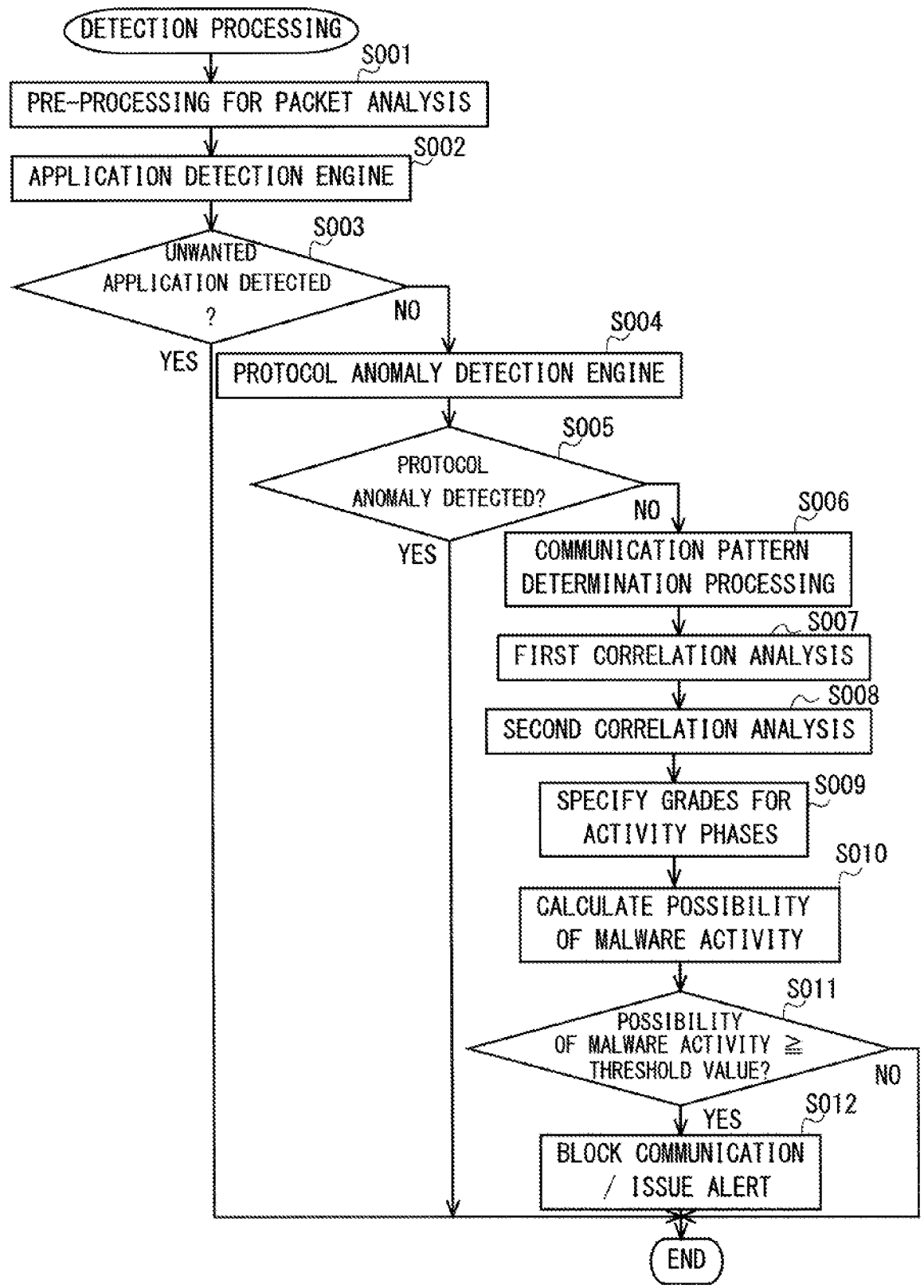
FIG. 5 is a flowchart showing an overview of a flow of detection processing for each packet relating to the embodiment.

FIG. 5 is a flowchart showing an overview of the flow of detection processing for each packet relating to the present embodiment. The detection processing relating to the present embodiment is executed by the network monitoring apparatus 20 whenever a packet (or data comprising a plurality of packets) passing over the network is acquired.

In step S001, pre-processing for packet analysis is executed. When a new communication (input packet) is acquired by the communication acquisition unit 21, the network monitoring apparatus 20 shapes and classifies the input packet, and associates the packet with a valid existing flow. Furthermore, the network monitoring apparatus 20 classifies the input packets and associates same with an existing flow, in terminal units, (transmission source/destination IP address (MAC address) units), and protocol units (TCP/UDP, ICMP, DNS, HTTP, HTTPS, IRC, FTP, TFTP, SOCKS, NetBIOS, etc.). Thereupon, the processing advances to step S002.

From step S002 to step S005, processing is carried out by the application detection engine 23 and the protocol anomaly detection engine 24. The network monitoring apparatus 20 relating to the present embodiment uses detection engines (detection programs) of the three types described above to detect an unauthorized communication by a terminal connected to the network, but in the present embodiment, upon acquiring a packet, the network monitoring apparatus 20 implements detection by the application detection engine 23 and the protocol anomaly detection engine 24, and then implements detection by the malware behavior detection engine 25. In other words, in the present embodiment, the malware behavior detection engine 25 determines whether or not a node 90 is used to conduct unauthorized activity based on communication which has not been detected as an unauthorized communication by the other detection units (the application detection engine 23 and the protocol anomaly detection engine 24). By adopting this composition, according to the present embodiment, the number of packets processed by the malware behavior detection engine 25 is reduced, and the load created by the operation of the behavior detection engine can be reduced. However, the malware behavior detection engine 25 may operate independently, or may operate in combination with the other detection engines. Furthermore, the processing sequence of the detection engine when the packets are acquired is not limited to the example indicated in the present embodiment.

When an unnecessary application is detected by the application detection engine 23 or when a protocol anomaly is detected by the protocol anomaly detection engine 24, the processing advances to step S012, and blocking is implemented or an alert is issued. On the other hand, if an unnecessary application or a protocol anomaly is not detected, then the processing advances to step S006. In the flow chart, the processing from step S006 to step S011 in this flowchart corresponds to the processing performed by the malware behavior detection engine 25.

In step S006, a communication pattern judgment process is carried out. The comparison unit 251 determines the communality between the input packet and a previously defined communication pattern (Pn-m), by comparing the input pack and the previously defined communication pattern (Pn-m). Here, if it is determined that there is communality between the communication pattern (Pn-m), then the phase in the activity transition model of the terminal (h) relating to the input packets is specified as the phase Pn(h). Furthermore, the evaluated value acquisition unit 252 acquires, as a result, of the determination, the grade Gr (Pn-m) of the communication pattern determined to be matching or approximate (corresponding), to be the grade Gr(h,Pm-m) for the input packet in association with the terminal (h). Moreover, the network monitoring apparatus 20 registers the transmission source terminal or the destination terminal of the communication in question, in a "malware delivery server candidate list" or "C&C server candidate list", based on the detected communication pattern. Here, a determination and evaluation is made in with respect to the communication patterns of all phases, by taking account of lost packets. In order to associate with the existing determined flow, a determination is not made with regard to an input packet which does not require an additional determination process, and only updating of the statistical information is carried out. Thereupon, the processing advances to step S007.

In step S007, a first correlation analysis is carried out. The communication pattern determination process (see step S006) is based on previously defined "communication patterns". Therefore, by this process alone, it is not possible to detect malware which is carrying out communications that do not match the communication patterns. Therefore, in the present embodiment, a first, correlation analysis is carried out. The evaluated value acquisition unit. 252 picks up a communication which has triggered a transition to the exploration phase P2, the infection and invasion phase P3, the execution file download phase P4 and the attack activity phase P9, and the network monitoring apparatus 20 registers the transmission source terminal or the destination terminal of the communication in question, in the C&C server candidate list. The Contents of processing of the first correlation analysis are described below with reference to FIG. 6 to FIG. 8. Thereupon, the processing advances to step S008.

In step S008, a second correlation analysis is carried out. Malware progressively deepens activity as it transfers through the phases of the malware activity transition model. Consequently, if the activity (communication) in the phases immediately after transition has a high possibility of being triggered by the activity (communication) in the phase one before (in other words, if there is a correlation between the phases before and after transition), then it is determined that the terminal in question has a high probability of being infected with malware. A method can be envisaged in which the trigger is determined from the data contents included in the communication pattern (for example, the contents of an instruction from a C&C server), but there are many types of malware which encrypt or obfuscate the data part, and real-time analysis and determination are difficult to achieve. Therefore, in the present embodiment, the second correlation analysis (see step S008) is carried out based on the time required to transfer phase (the time from detecting the communication pattern Pr-s until detecting the communication pattern Pm-n), the terminal (h) of the communication destination (call-back communication), the correlation and degree of match between the behavior of a plurality of terminals having a high possibility of malware infection, and information such as the type of file handled, etc. If, as a result of this analysis, it has been possible to detect that the communication is one having a high suspicion of malware behavior, then the grade Gr(Pm-n) of the communication pattern Pm-n corresponding to this communication is corrected (multiplied by a malware behavior similarity coefficient θ), to assign a higher grade.

The correction unit 253 analyzes the correlation between the continuity of the phase which was active immediately before, and the behavior of another (infected) terminal, in respect of the activity phase Pn(h) of the terminal (h) determined in step S006. If, as a result of this analysis, a communication pattern having a high risk of malware behavior is discovered, then the correction unit 253 corrects the grade Gr(h,Pn-m) of the communication pattern (Pn-m) in the terminal (h) determined in step S0006, using the following equation, and assigns a higher grade.

$$Gr(h,Pn\text{-}m) = \theta \cdot Gr(h,Pn\text{-}m)$$

Here, the malware behavior similarity coefficient θ is in the range of 1.0 to 2.0. Here, 1.0 means "no similarity". The contents of processing of the second correlation analysis, and the malware behavior similarity coefficient θ are described below with reference to FIG. 6 to FIG. 8. Thereupon, the processing advances to step S009.

However, the correlation analysis is not limited to the example indicated in the present embodiment, provided that it is possible to analyze whether or not a plurality of communications performed by a terminal have a correlation from the viewpoint of phase transitions which accompany malware activity.

In step S009, grades (PGr) are specified for the activity phases. The specification unit 254 specifies a grade PGr(h, Pn)i for a phase Pn, from the grade Gr(h, Pn-m) of the communication pattern in the corresponding terminal h, based on the processing results from step S006 to step S008.

Here, PGr(h, Pn)i−1 indicates the grade for the phase Pn up to the previous processing.

$$PGr(h,Pn)i = \max\{PGr(h,Pn)i\text{-}1, Gr(h,Pn\text{-}m)\}$$

Thereupon, the processing advances to step S010.

In step S010, the possibility of malware activity (IR(h)) is calculated. The totalizing unit 256 and the determination unit 257 calculate the possibility of malware activity IR(h) for the terminal h. The specific calculation method is as described above in the explanation relating to the totalizing unit 256 and the determination unit 257. Thereupon, the processing advances to step S011.

In step S011 and step S012, if the possibility of malware activity IR(h) is equal to or greater than a prescribed threshold value, then a countermeasure, such as blocking of the terminal or issuing of an administrator alert, is carried out. The determination unit 257 determines whether or not the possibility of malware activity in the terminal calculated in step S010 is equal to or greater than the prescribed threshold value representing "black" (step S011). If the possibility of malware activity is "black", then the communication blocking unit 22 carries out a countermeasure, such as blocking the communication by the terminal in question, or issuing an alert to the administrator (step S012), Furthermore, if the possibility of malware activity is "grey", then the network monitoring apparatus 20 may issue an alert to the administrator. If the possibility of malware activity is "clean", then a countermeasure such as blocking or issuing an alert is not carried out. Subsequently, the processing indicated in the flowchart is terminated.

Figure 6:
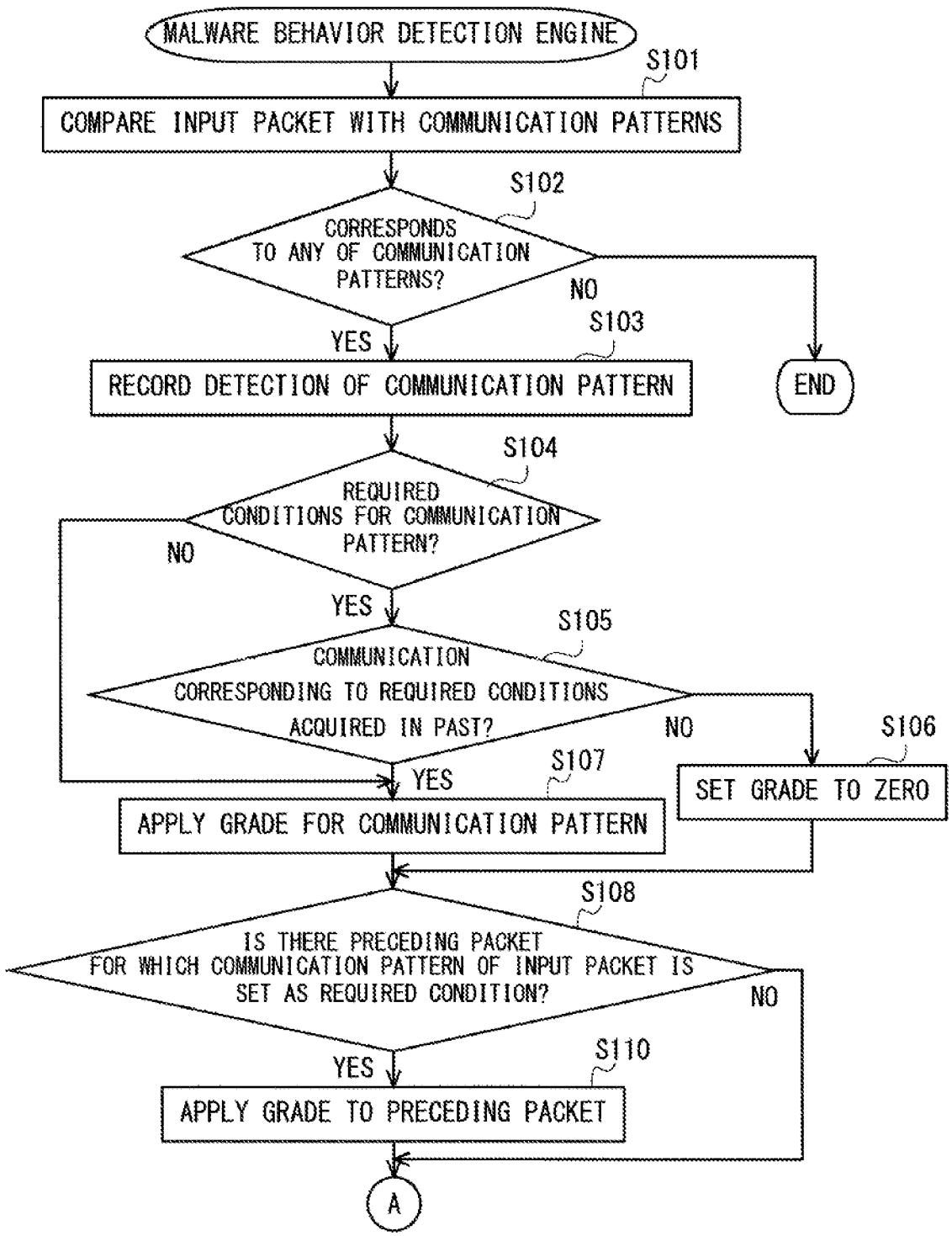
FIG. 6 is a flowchart (A) showing a flow of detection processing performed by the malware behavior detection engine relating to the embodiment.
Figure 7:
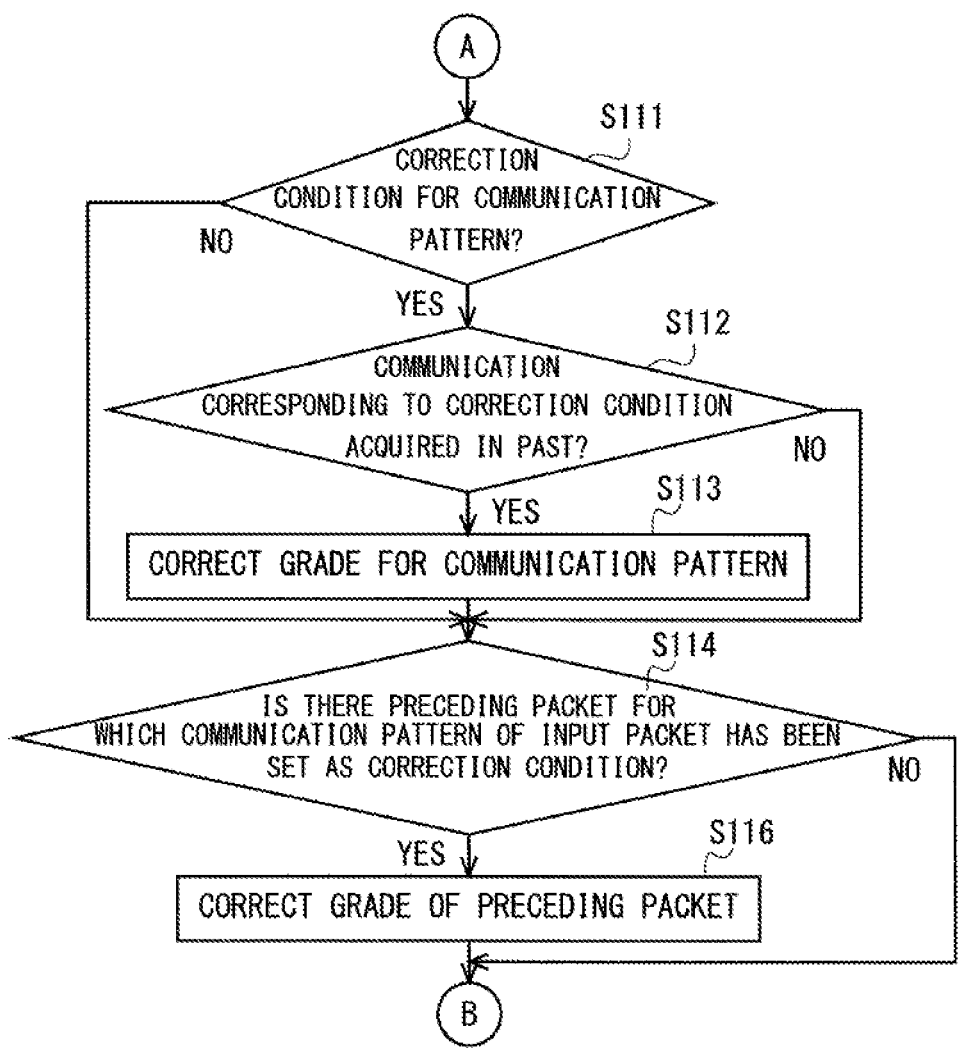
FIG. 7 is a flowchart (B) showing a flow of detection processing performed by the malware behavior detection engine relating to the embodiment.
Figure 8:
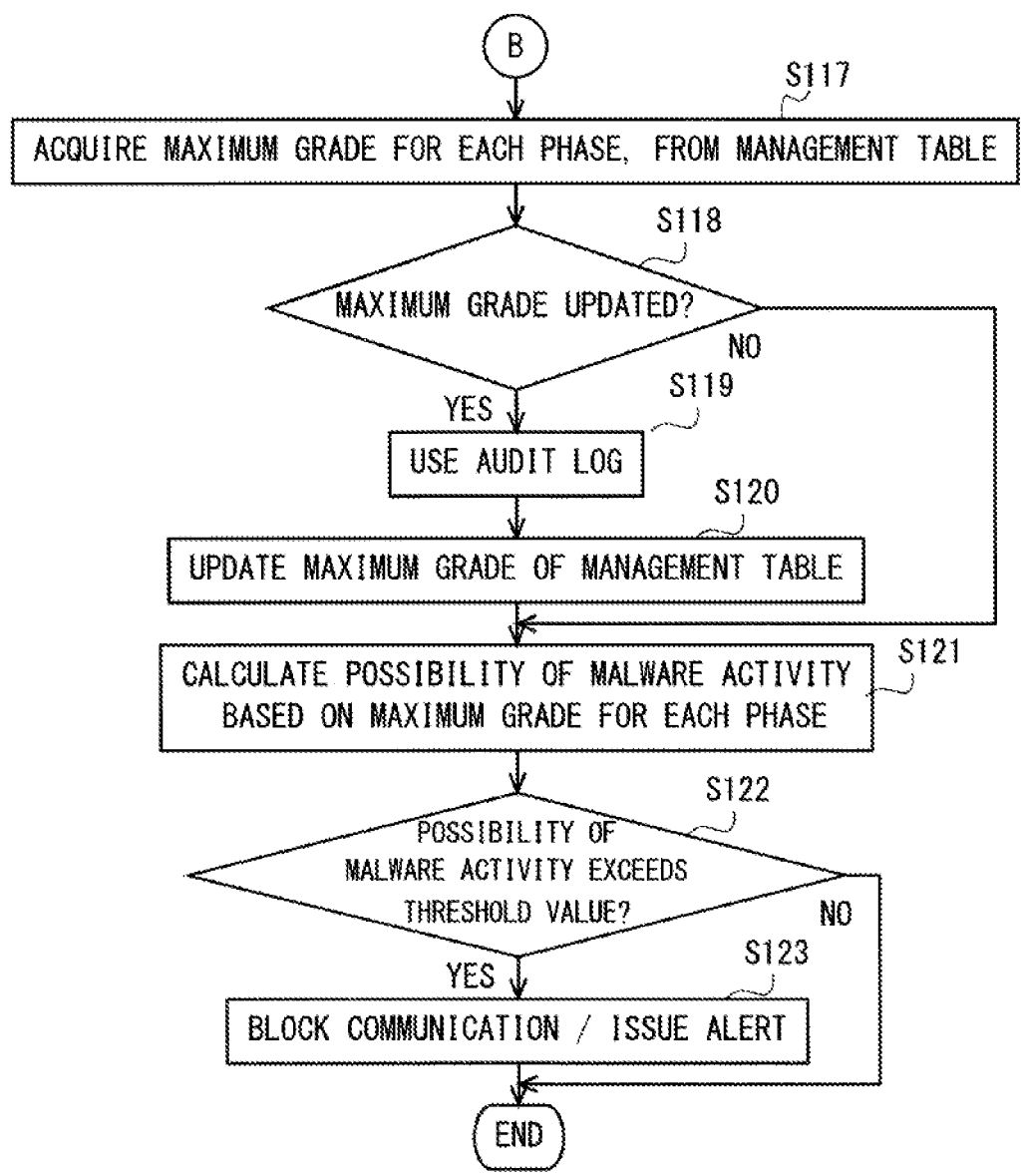
FIG. 8 is a flowchart (C) showing a flow of detection processing performed by the malware behavior detection engine relating to the embodiment.

FIG. 6 to FIG. 8 is a flowchart showing a flow of a detection process performed by the malware behavior detection engine 25 relating to the present embodiment. The flowchart gives a more detailed explanation of the processing from step S006 to step S012 of the detection processing described in relation to FIG. 5. More specifically, step S101 to step S103 give a more detailed explanation of the communication pattern determination processing described in step S006 in FIG. 5; step S104 to step S110 give a more detailed explanation of the first correlation analysis processing described in step S007; step S111 to step S116 give a more detailed explanation of the second correlation analysis processing described in step S008; and step S117 to step S120 give a more detailed explanation of the grade specification processing for activity phases described in step S009. Furthermore, step S121 corresponds to step S010 in FIG. 5, and step S122 and step S123 correspond to step S011 and step S012.

In step S101 and step S102, it is determined whether or not the acquired packet (input packet) corresponds to any of the previously defined communication patterns. The comparison unit 251 determines the communality between the input packet and a previously defined communication pattern (Pn-m), by comparing the input packet and the previously held communication pattern. As a result of this determination, if it is determined that the input packet does not correspond to any communication pattern, then the processing relating to the packet in question is terminated, and the processing indicated in the flowchart is terminated. On the other hand, if it is determined that the packet does correspond to any one of the communication patterns, then the processing advances to step S103.

In step S103, the fact that a communication pattern (Pn-m) determined to be corresponding has been detected is recorded in relation to the terminal relating to the input packet. Furthermore, the evaluated value acquisition unit 252 acquires the phase Pn to which the communication pattern (Pn-m) corresponding to the input packet belongs, and the grade Gr (Pn-m) set in advance for the communication pattern (Pn-m), respectively, as the phase Pn(h) in the terminal (h) relating to the input packet and the grade Gr(h, Pn-m) for the phase in question. Thereupon, the processing advances to step S104.

In step S104 and step S105, if required conditions are set for the communication pattern corresponding to the input packet, then it is determined whether or not a communication corresponding to the required conditions has been acquired in the past. If required conditions have not been set, then the processing advances to step S107. Here, the required conditions are conditions for deciding whether or not a grade Gr(Pn-m) set in advance for a communication pattern (Pn-m) determined to correspond to the input packet in step S101 may be specified as the grade Gr (h, Pn-m) for the phase Pn(h) of the terminal (h) relating to the input packet in question. For example, a communication pattern of "P6-4: HTTP communication (proxy/non-proxy) having HTTP standard port (80) as the destination port" is a general communication in HTTP, and an required condition for this communication pattern is that any of the "HTTP malicious communication patterns" defined in "P0-1 to P0-15" is detected. Therefore, if these required conditions are satisfied, then the grade Gr(h, P6-4) of the communication pattern P6-4 is specified in respect of the input packet, and if the required conditions are not satisfied, then the grade Gr(h, P6-4) of the communication pattern P6-4 is not specified in respect of the input packet.

In other words, the evaluated value acquisition unit 252 determines whether or not there is continuity between the phase acquired in respect of the input packet and the phase acquired in respect of another communication (preceding packet) carried out before the communication in question, in respect of the terminal relating to the communication in question, by determining whether or not a communication acquired in the past satisfies the required conditions. If it is determined that the required conditions are not satisfied, then the processing advances to step S106, and the grade of the input packet is set to 0 (zero). On the other hand, if it is determined that the required conditions are satisfied, then the processing advances to step S107.

In step S107, grades are assigned for the phases in the terminal relating to the input packet. The evaluated value acquisition unit 252 acquires a grade Gr(Pn-m) previously defined for the communication pattern Pn-m which is determined to be corresponding, in respect of the input packet, and sets same as the grade Gr(h,Pn-m) for the phase Pn(h) in the terminal (h). Thereupon, the processing advances to step S108.

In step S108, it is determined whether or not the input packet corresponds to the required conditions of a communication pattern detected in the past. In other words, in step S108, at the current time, which corresponds to the future from the viewpoint of a communication acquired in the past (preceding packet), it is determined whether or not a communication (input packet) corresponding to the required conditions has been detected. The evaluated value acquisition unit 252 determines whether or not a communication pattern has been detected in the past, for which the communication pattern of the input packet has been set as an required condition. As a result of this determination, if a communication pattern having the communication pattern relating to the input packet as a required condition has not been detected in the past, the processing advances to step S111. On the other hand, if, as a result of this determination, a communication pattern having the communication pattern relating to the input packet as a required condition has not been detected in the past, the processing advances to step S110.

In step S110, grades are assigned for the phase of the communication acquired in the past (preceding packet). The evaluated value acquisition unit 252 acquires and assigns a grade Gr(Pn-m) previously defined for the communication pattern in question (Pn-m), to the communication detected in the past. Thereupon, the processing advances to step S111.

In step S111 and step S112, if a grade correction condition is set for the communication pattern corresponding to the input packet, then it is determined whether or not a communication corresponding to the grade correction condition has been acquired in the past. If a grade correction condition has not been set, then the processing advances to step S114. Here, a grade correction condition is a condition for determining whether or not a grade Gr(Pn-m) set previously for the communication pattern (Pn-m) determined to correspond to the input packet in step S101 should be corrected to a higher value. The correction unit 253 determines whether or not a communication corresponding to a grade correction condition has been detected in the past in respect of the terminal relating to the input packet. If it is determined that the grade correction condition is not satisfied, then grade correction is not carried out and the processing advances to step S114. On the other hand, if it is determined that the grade correction condition is satisfied, then the processing advances to step S113.

In step S113, grade correction is carried out. The correction unit 253 corrects the grade Gr(h,Pn-m) assigned in step S107, in accordance with the correction value set in advance in respect of the grade correction condition which is determined to have been satisfied in step S112. For example, if the correction value is 1.5, then the value of the grade Gr(h, Pn-m) is multiplied by 1.5 times. Thereupon, the processing advances to step S114.

In step S114, it is determined whether or not the input packet corresponds to the grade correction condition of a communication pattern detected in the past. In other words, in step S114, at the current time, which corresponds to the future from the viewpoint of a communication acquired in the past (preceding packet), it is determined whether or not a communication (input packet) corresponding to the grade correction condition has been detected. The correction unit 253 determines whether or not a communication pattern has been detected in the past, for which the communication pattern of the input packet has been set as a grade correction condition. As a result, of this determination, if a communication pattern having the communication pattern relating to the input packet as a grade correction condition has not been detected in the past, then the processing advances to step S117. On the other hand, if, as a result of this determination, a communication pattern having the communication pattern relating to the input packet as a grade correction condition has been detected in the past, then the processing advances to step S116.

In step S116, grade correction relating to a past communication (preceding packet) is carried out. The correction unit 253 corrects the grade assigned to the terminal relating to the communication pattern detected in the past, by the correction value defined in advance in relation to the grade correction condition. For example, if the correction value is 1.5, then the grade is multiplied by 1.5 times. Thereupon, the processing advances to step S117.

In step S117 to step S120, a maximum grade updating process is carried out for each phase. Firstly, the network monitoring apparatus 20 acquires the maximum grade (the value after correction in the case of a grade which is corrected), which is held for each detection phase (P1 to P9) in the terminal relating to the input packet, from the grade management table (step S117), and determines whether or not the maximum grade has been updated, for each phase, by comparing the maximum grade with the grade specified by the specification unit 254 as a result of the processing from step S101 to step S116 (step S118). Here, if it is determined that the maximum grade has not been updated, then the processing advances to step S121. On the other hand, if it is determined that the maximum grade has been updated, then the holding unit 255 uses the newly assigned grade to update the maximum grade recorded in the grade management table, and saves this maximum grade (step S120). During this process, an audit, log is kept (step S119). Thereupon, the processing advances to step S121.

In step S121, the possibility of malware activity in the terminal is calculated. The totalizing unit 256 totalizes the maximum grade which has been determined for each phase in the terminal h, and the determination unit 257 calculates the possibility of malware activity IR(h) in the terminal h, by multiplying by a malware activity coefficient. The specific calculation method is as described above in the explanation relating to the totalizing unit 256 and the determination unit 257. Thereupon, the processing advances to step S122.

In step S122 and step S123, the presence or absence of a malware infection in the object node 90 is determined. The determination unit 257 determines whether or not the possibility of malware activity IR(h) calculated in step S121 exceeds a prescribed threshold vale (step S122). Here, if it is determined that the possibility of malware activity IR(h) has exceeded a threshold value, then the network monitoring apparatus 20 implements the prescribed countermeasure for when a malware infection is detected. Examples of the countermeasure for when a malware infection is detected include: starting blocking of the communication at the node 90 by the communication blocking unit 22, and issuing an alert (warning) indicating that the node 90 in question is infected with malware. On the other hand, if it is determined that the possibility of malware activity IR(h) has not exceeded the threshold value, then the countermeasure for when a malware information has been detected, such as blocking of the communication or issuing a warning, etc. is not implemented. Subsequently, the processing indicated in the flowchart is terminated.

The network monitoring apparatus 20, for example, can block the communication by the node 90 by using, for example, a method which discards communication data acquired, from an L2/L3 switch, a method which disconnects the ports of an L2/L3 switch, a method for deriving a packet transmission destination due to ARP impersonation in respect of the node 90, a method for instructing the router 10 to discard a communication relating to the node 90, or a method for changing and separating the VLAN to which the node 90 belongs. Furthermore, if the network monitoring apparatus 20 is installed (incorporated) into the router 10, then it is also possible to directly block communication which is sent or received by the node 90. Moreover, the network monitoring apparatus 20 can issue an alert by using a method for sending a notification packet, or e-mail, etc. to the management server, the node 90, or a previously established administrator terminal, or the like, or, for example, a method for displaying a warning via a display apparatus (display monitor, LED, etc.) which is provided in the actual network monitoring apparatus 20.

<Classification of Activity of Terminal>

There are various types of malware posing different threats ranging from those that cause critical damage to those that cause slight harm, represented by high-level targeted attacks, such as malware aimed at stealing confidential information from a targeted organization or business or aimed at system destruction, malware aimed at stealing money from online banks, and malware that encrypts files on a PC or locks a PC and demands a ransom, as well as malware that displays unwanted advertisements to the user and ultimately seeks to make a financial gain, or malware that simply displays screens to invoke fear, for the purpose of harassment.

However, in the detection process which is described here with reference to FIG. 6 to FIG. 8, it is possible to detect that there is a malware infection of some kind, but the threat (degree of danger) of the infected malware and the type of malware is not determined, and hence there is a problem in that "prioritization of response" cannot be made in respect of a plurality of malware detection incidents that occur simultaneously, and there is a problem in that it takes time to ascertain the attack method and specify suitable countermeasures.

Therefore, in the present embodiment, the correlation analysis unit 258 specifies the type of behavior of the terminal, and the classification unit 259 classifies the unauthorized activity of the terminal on the basis of the type of behavior, thereby obtaining information that serves to determine the extent at which the terminal is in a dangerous state.

Figure 9:
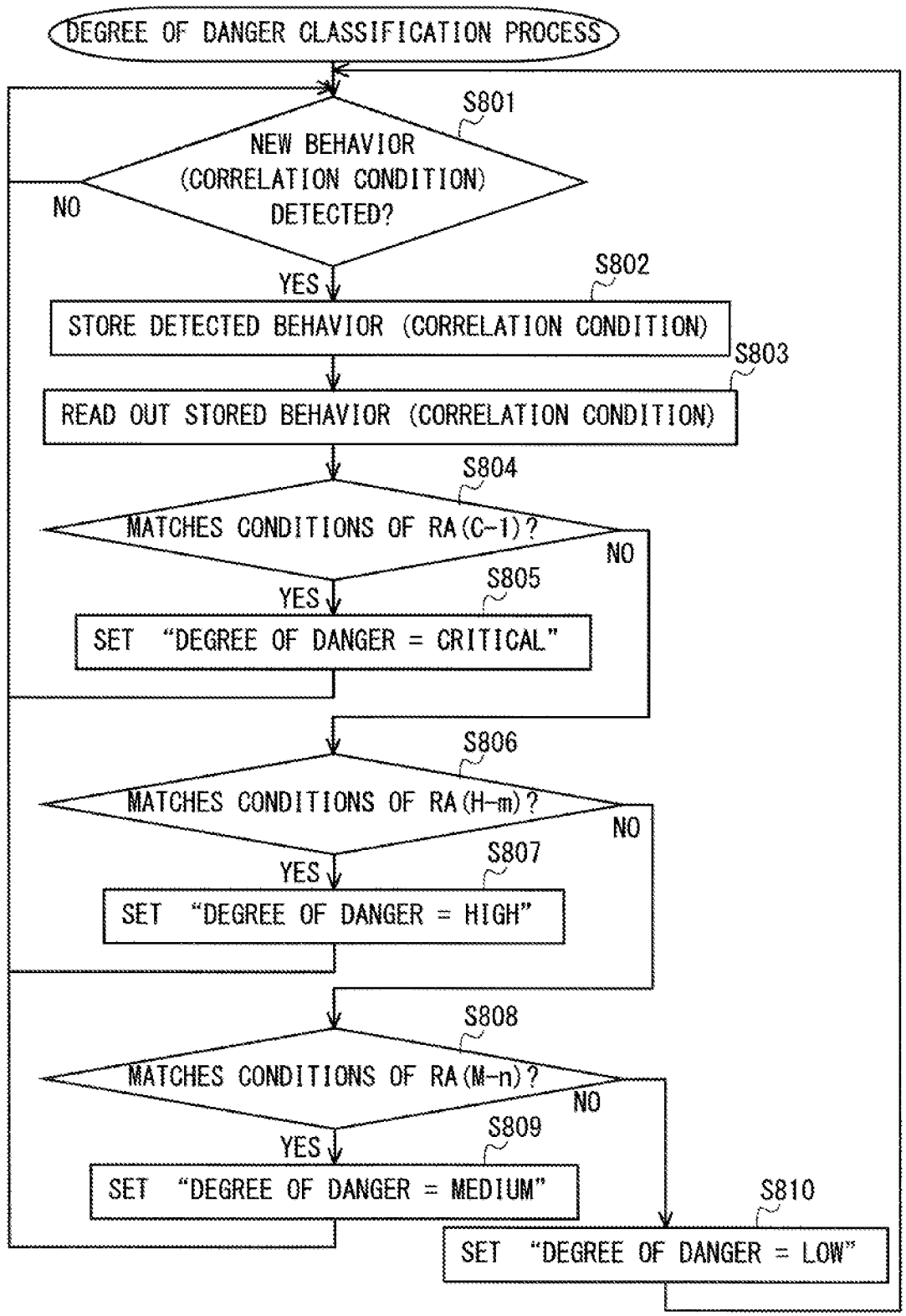
FIG. 9 is a diagram showing a flow of degree of danger classification processing relating to the embodiment.

FIG. 9 is a diagram showing a flow of degree of danger classification processing relating to the embodiment. The processing illustrated in this flowchart is executed in parallel with the detection process for each packet that was described with reference to FIG. 5 to FIG. 8, while the network monitoring apparatus 20 is running.

In step S801 and step S802, whenever a behavior matching any of the correlation conditions is newly detected in a terminal (h), the matched correlation condition CA is stored as a type of behavior of that terminal (h). In the detection process for each packet described with reference to FIG. 5 to FIG. 8, the correlation analysis unit 258 determines whether or not the terminal (h) matches any new correlation condition in respect of the input packet (step S801). If the terminal matches a new correlation condition, then the correlation analysis unit 258 specifies the type of behavior corresponding to that correlation condition as a type of behavior of that terminal, and stores the type of behavior in association with the identification information of the terminal (h) in a table, or the like, in the RAM 13a (step S802).

Examples of the relationships between the correlation conditions used to determine the degree of danger and the malware behavior corresponding to the correlation conditions, these relationships being used by the correlation analysis unit 258 to specify the type of behavior of the terminal, are given below. Here, the correlation condition CA (m-n-x) indicates a correlation condition related to the behavior of traffic observed when the activity phase of the terminal (h) transitions from phase Pm to phase Pn.

CA(1-4-m) (m=1 to 11): Drive-by Download attack by Exploit Kit

CA(2-6-m) (m=2, 3): Detection of C&C communication after network environment exploration CA(3-3-1): Spread of infection CA(3-6-m) (m=1 to 3): Detection of C&C communication after spread of infection CA (4-2-2): Exploration of network environment immediately after activation of malware CA(4-4-3): Download of multiple exploit tools or other malware
CA(4-4-5): Download by file operation attached to e-mail
CA(4-6-m) (m=1 to 4): Detection of C&C communication after malware infiltration
CA(5-5-1): Exploration of valid C&C server
CA(5-6-1): Detection of C&C communication after exploration of valid C&C server
CA(6-3-m) (m=1 to 3): Spread of infection
CA(6-4-m) (m=1 to 5): Download of exploit tools or other malware
CA(6-6-m) (m=2): Exploration of valid C&C server
CA(6-6-m) (m=3 to 6): C&C beacon
CA(6-6-8): Detection of communication involving suspicious behavior that, disrupts security apparatus
CA(6-6-10): C&C beacon
CA (6-6-11): Suspicious communication prohibited access by security apparatus (proxy)
CA(6-6-m) (m=12 to 14): Remote control operation by attacker
CA(6-6-15): C&C beacon
CA(6-7-m) (m=1, 2): Upload of stolen information
CA(7-6-1): Upload of stolen information
CA (8-6-m) (m=1, 2): Man in the Browser (MITB), Man in the Middle (MITM)

Even if the transition source phase and the transition destination phase are the same (for example, a phase transition from phase P1 to phase P4), there are still cases where the behavior is different on the basis of further ancillary conditions that accompany the phase transition. The sign x of the correlation condition CA (m-n-x) is a sign that is attached to these ancillary conditions. For example, the correlation condition CA(1-4-1) is behavior that satisfies the correlation condition "communication pattern P1-m of phase P1 detected" and "after detection of P1-m, communication pattern P4-n of phase P4 detected on same TCP connection where P1-m detected", among the behavior correlation conditions CA(1-4-x) in which the terminal (h) transitions from phase P1 to phase P4 in relation to an input packet.

If a new correlation condition is not detected, then the processing in step S801 is repeated until one is detected. If, on the other hand, a new correlation condition is detected, then when the type of behavior of the terminal has been specified, the processing advances to step S803.

From step S803 to step S810, the degree of danger in the terminal is specified. The classification unit 259 reads out the types of behavior (correlation conditions) which have been recorded in respect of terminal (h) and stored by repeating the processing from step S801 to step S802 (step S803). The classification unit 259 classifies the unauthorized activity of the terminal by referring to information that indicates correspondences between classifications of unauthorized activity and the one or plurality of types of behavior related to the unauthorized activity (step S804 to step S810).

Examples of the relationships between the degree of danger and the one or plurality of correlation conditions (types of behavior) corresponding to the degree of danger, which are used by the classification unit 259 to specify the degree of danger in the terminal, are given below. Here, the degree of danger RA (m-n) indicates the level of the danger (C: critical; K: high; M: medium; L: low), and n types of danger within the danger of the same level. Below, reference to "detecting a correlation condition" means that "the type of behavior corresponding to a correlation condition has been detected due to the behavior of the terminal matching that correlation condition".

RA(C-1): Multiple high-risk activities caused by continuing attack detected.
Condition: Two or more different RA(H-m) (m=1 to 14) detected among conditions RA(H-m) (m=1 to 14) which have RL(h)=high.
RA(H-1): Infiltration activity caused by drive-by download attack detected.
Condition: Any correlation condition CA(1-4-m) (m=1 to 11) detected, and
after detection of the abovementioned correlation condition,
any of CA(4-6-n) (n=1 to 4),
any of CA(6-6-n) (n=3 to 6), or
either of CA(6-6-10) or CA(6-6-11) detected, and
IR value is Red (80%) or above, or has risen to Red (80%) after detection of the abovementioned conditions.
RA(H-2): Infiltration activity caused by operation of suspicious file or URL link attached to electronic mail detected.
Condition: Correlation condition CA(4-4-5) detected, and
after detection of the abovementioned correlation condition,
any of CA(4-6-n) (n=1 to 4),
any of CA(6-6-n) (n=3 to 6), or
either of CA(6-6-10) or CA(6-6-11) detected, and
IR value is Red (80%) or above, or has risen to Red (80%) after detection of the abovementioned conditions.
RA(M-3): Dubious file downloaded by drive-by download attack detected.
Condition: Any correlation condition CA(1-4-m) (m=1 to 11) detected.
RA(M-4): Dubious file downloaded by operation of suspicious file.
Condition: Correlation condition CA(4-4-5) detected.
RA(L-1):
Condition: Does not match either RA(H-m) or RA(M-n).

In classification, the classification unit 259 progressively investigates in order from the behavior related to the highest degree of danger, and sets the first matching degree of danger, thereby preventing the mistaken setting of a low degree of danger (see flowchart). When the degree of danger has been set, the process returns to step S801.

According to the degree of danger classification process described above, it is possible to assign a degree of danger to the unauthorized activity of a terminal on the basis of the severity of the damage caused to the organization or business by the attacker's actions, and it is possible to obtain important information that serves as an indicator for prioritization of response. An indicator of this kind is highly effective in large-scale networks in which malware infection may be detected in several dozens of machines at the same time.

Furthermore, the degree of danger of the infecting malware can be ascertained in a short period of time if the malware is already known, but unknown malware, or subspecies of malware, are increasing at present and this malware generally requires functional analysis to become clear, and this takes time. However, according to the degree of danger classification process relating to the present embodiment, it is possible to infer the degree of danger from the behavior of communication immediately after infection, and it is possible to determine the degree of danger without functional analysis of known or unknown malware (including subspecies of malware), prioritization of response to a malware infection is possible, and swift response and counter-measures can be undertaken.

Figure 10:
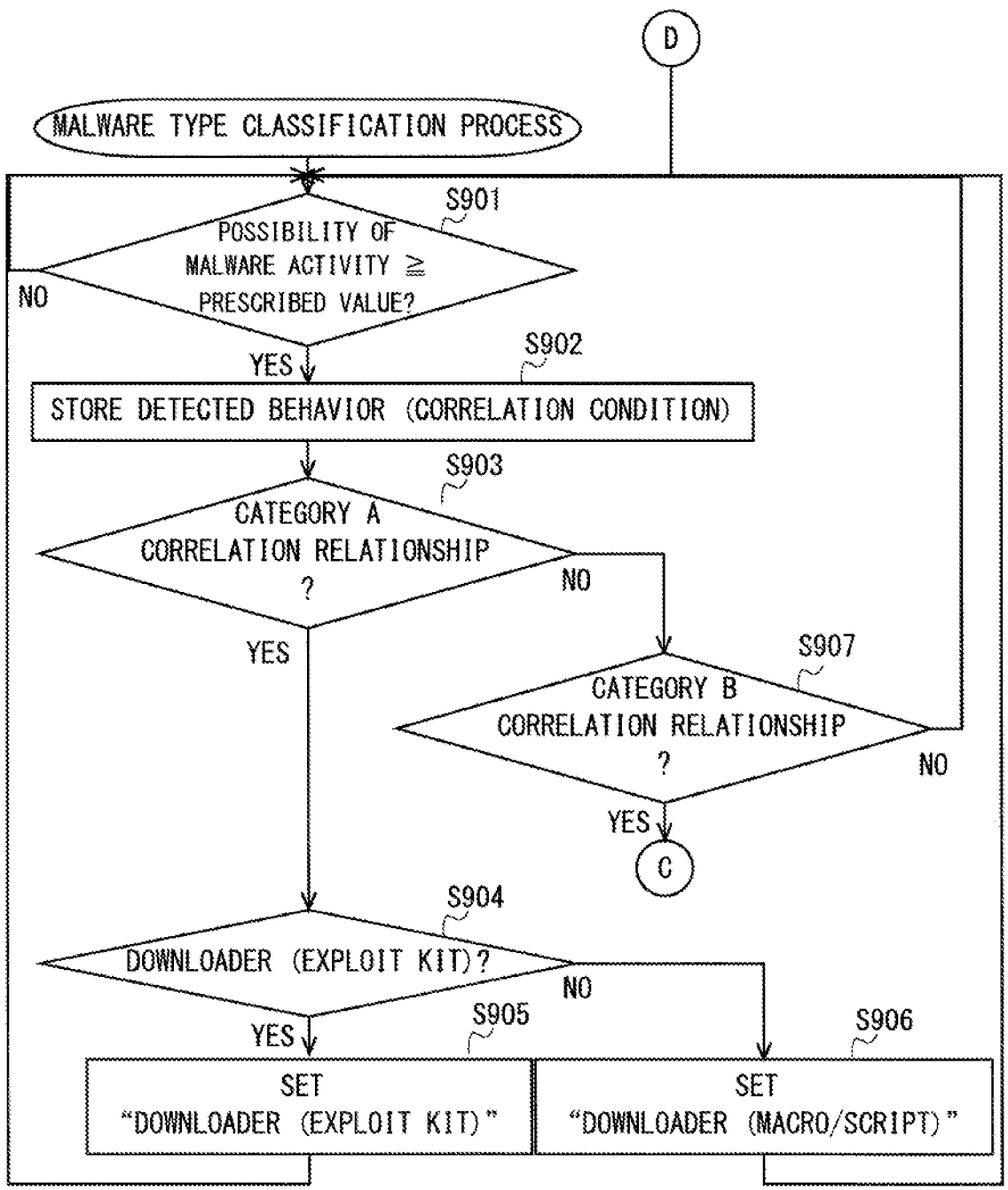
FIG. 10 is a diagram (1) showing a flow of malware type classification processing relating to the embodiment.
Figure 11:
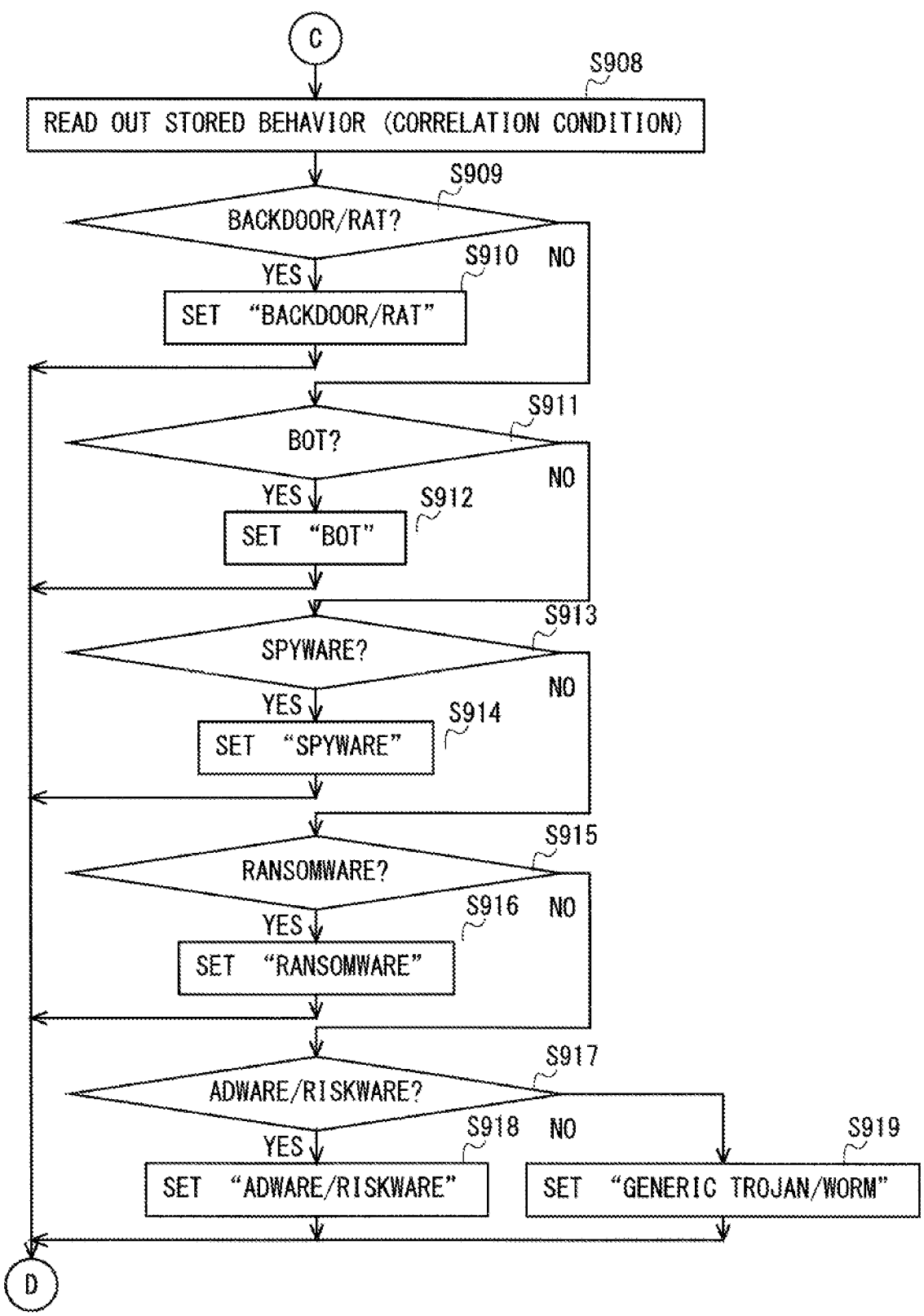
FIG. 11 is a diagram (2) showing a flow of malware type classification processing relating to the embodiment.

FIG. 10 and FIG. 11 are diagrams showing a flow of malware type classification processing relating to the embodiment. The processing illustrated in this flowchart is executed in parallel with the detection process for each packet that was described with reference to FIG. 5 to FIG. 8, while the network monitoring apparatus 20 is running.

In step S901 and step S902, if the possibility of malware activity IR(h) of a terminal (h) is equal to or greater than a prescribed value, then the type of behavior CA that is newly detected in this case is stored as a type of behavior CA of the terminal (h) in question. The correlation analysis unit 258 determines whether or not the possibility of malware activity IR(h) calculated in the detection process for each packet described with reference to FIG. 5 to FIG. 8 is equal to or greater than a prescribed value (for example, 80) (step S901).

If the possibility of malware activity IR(h) is less than the prescribed value, then it is difficult to determine the type of malware accurately, and therefore a value indicating "Unclassified" is set in the field where the value indicating the malware type that is active in the terminal (h) is set (not illustrated in the drawings).

On the other hand, if the possibility of malware activity IR(h) of the terminal (h) is equal to or greater than the prescribed value, then the correlation analysis unit 258 specifies the newly detected type of behavior as a type of behavior of that terminal, and stores the type of behavior in association with the identification information of the terminal (h) in a table, or the like, in the RAM 13a (step S902).

Below, typical functions of malware which can be inferred from the behavior on the network, and correlation conditions used to determine the presence or absence of these functions, are indicated for each recent category. Similarly to the degree of danger classification process described above, the correlation condition CA (m-n-x) indicates a correlation condition related to the behavior of traffic observed when the activity phase of the terminal (h) transitions from phase Pm to phase Pn.

[Function category A: Stealing and upload of confidential information (Data Exfiltration)]
  CA(6-7-n) n=1, 2: Upload of stolen information
  CA(7-6-1): Upload of stolen information
  CA(8-6-n) n=1, 2: MITB, MITM

[Function category B: Download of suspicious file (binary, configuration definition, etc.) (Download of Malicious File)]
  CA(1-4-n) (n=1 to 11): Drive-by Download attack by Exploit Kit
  CA(4-4-5): Download by file operation attached to mail
  CA(6-4-n) n=1 to 5: Download of exploit tools or other malware
  CA(4-4-4): Download from other site

[Category C: Check of network environment (Network Environment Check)]
  CA(4-2-2): Exploration of network environment immediately after activation of malware

[Function category D: C&C server exploration (Network Environment Check)]
  CA(6-6-1): Exploration of valid C&C server
  CA(6-6-2): Exploration of valid C&C server

[Function category E: C&C server communication]
  CA(6-6-3 to 6-6-6): C&C beacon
  CA(6-6-10): C&C beacon
  CA(6-6-15): C&C beacon

[Function category F: Remote control]
  CA(6-6-12): Remote control operation by attacker
  CA(6-6-13): Remote control operation by attacker
  CA(6-6-14): Remote control operation by attacker

[Function category G: Switching of C&C server]
  CA(6-6-9): Switching of C&C server

[Function category H: Spread of infection (Infiltration/Spread of Infection)]
  CA(3-3-1): Spread of infection
  CA(6-3-n) n=1, 2, 3: Spread of infection

[Function category I: C&C communication caused by malware infiltration]
  CA (4-6-n) n=1 to 4: Detection of C&C communication after malware infiltration As indicated in the description of FIG. 9, even if the transition source phase and the transition destination phase are the same, the behavior may be handled differently on the basis of other ancillary conditions which accompany the phase transition, and the sign x of the correlation condition CA (m-n-x) is a sign attached to these ancillary conditions.

If a new correlation condition is not detected, then the processing in step S901 is repeated until one is detected. If, on the other hand, a new correlation condition is detected, then when the type of behavior of the terminal has been specified, the processing advances to step S903.

In step S903 to step S906, the malware type of the malware that is active in terminal (h) is specified in relation to the malware types which belong to category A (the malware group of the infiltration stage). The classification unit 259 classifies the unauthorized activity of the terminal by referring to information that indicates correspondences between classifications of unauthorized activity and the types of behavior (correlation conditions) related to the unauthorized activity.

Examples of the relationships between malware types and the correlation conditions (type of behavior) corresponding to the malware types, which are used by the classification unit 259 in order to specify the malware types belonging to category A (the malware group of the infiltration stage), are given below.

Downloader (Exploit Kit):
Condition: Any correlation condition CA(1-4-n) n=1 to 11 detected.
Downloader (Macro/Script):
Condition: CA(4-4-5) detected.

On the other hand, if the malware type of the malware that is active in terminal (h) is not a malware type belonging to category A (the malware group of the infiltration stage), then the process advances to step S907.

In step S907 to step S919, the malware type of the malware that is active in terminal (h) is specified in relation to the malware types which belong to category B (the malware group of the attack stage). The classification unit 259 reads out the types of behavior (correlation conditions) which have been recorded in respect of terminal (h) and stored by repeating the processing from step S901 to step S902 (step S908). The classification unit 259 classifies the unauthorized activity of the terminal by referring to information (here, a map) that indicates correspondences between classifications of unauthorized activity and the one or plurality of types of behavior (correlation conditions) related to the unauthorized activity (step S909 to step S919).

Examples of the relationships between malware types and the one or plurality of correlation conditions (types of behavior) corresponding to the malware types, which are used by the classification unit 259 in order to specify the malware types belonging to category B (the malware group of the attack stage), are given below.

Spyware:
Condition: Any one of CA(6-7-n) n=1, 2; CA(7-6-1); and CA(8-6-n) n=1, 2 detected;
  none of CA (6-6-n) n=12, 13, 14 detected; and
  CA(6-6-15) not detected.

Generic Trojan/Worm:
Condition: Does not correspond to any condition for specifying any other malware type belonging to category B.

Examples of malware types belonging to category B include Backdoor/FLAT, Bot, Ransomware, Adware/Riskware, etc., in addition to the Spyware and Generic Trojan/Worm described above. It is possible to classify malware according to these malware types by setting corresponding types of behavior (correlation conditions). When the malware types have been set, the process returns to step S901.

In other words, in the malware type classification process according to the present embodiment, the type of malware is inferred from the combined conditions of the detected correlation conditions, by mapping the "correlation condition of traffic transmitted and received by malware" and the "characteristic behavior of traffic that occurs when a function of malware is operating".

In general, the type of infecting malware is inferred and specified by investigating the functions of the malware through infection damage analysis, but inferring the type of unknown or subspecies malware requires analysis of the internal structure of the malware, which takes a very long time indeed. According to the malware type classification process of the present embodiment, it is possible to infer the type of malware without analyzing the internal structure of subspecies or unknown malware, by tracking the behavior of communications immediately after infection with malware, and therefore it is possible to obtain information that is effective for undertaking suitable response and countermeasures in accordance with the type of infecting malware corresponding to the malware infection. Furthermore, by determining the malware type, it is also possible to infer the attack method and/or damage circumstances, from the malware type used.

Moreover, when the type of unauthorized activity in the terminal (h) is specified by the processing illustrated in FIG. 9 to FIG. 11, the network monitoring apparatus 20 executes a previously established correspondence process in accordance with the specified classification. For example, the network monitoring apparatus 20 is able to start blocking of communications at the node 90 in question by the communication blocking unit 22, or to report the classification of the malware that has infected the node 90, etc.

<Variations>

In the embodiment described above, an example is given in which the network monitoring apparatus 20 operates in a passive mode of acquiring packets or frames, etc. which are sent and received by a node 90, by being connected to a monitoring port (mirror port) of a switch or router, and the network monitoring apparatus 20 does not transfer the acquired packets (see FIG. 1). However, the network configuration illustrated in the embodiment given above is one example of implementing the present disclosure, and other network configuration may be employed in implementing the disclosure.

Figure 12:
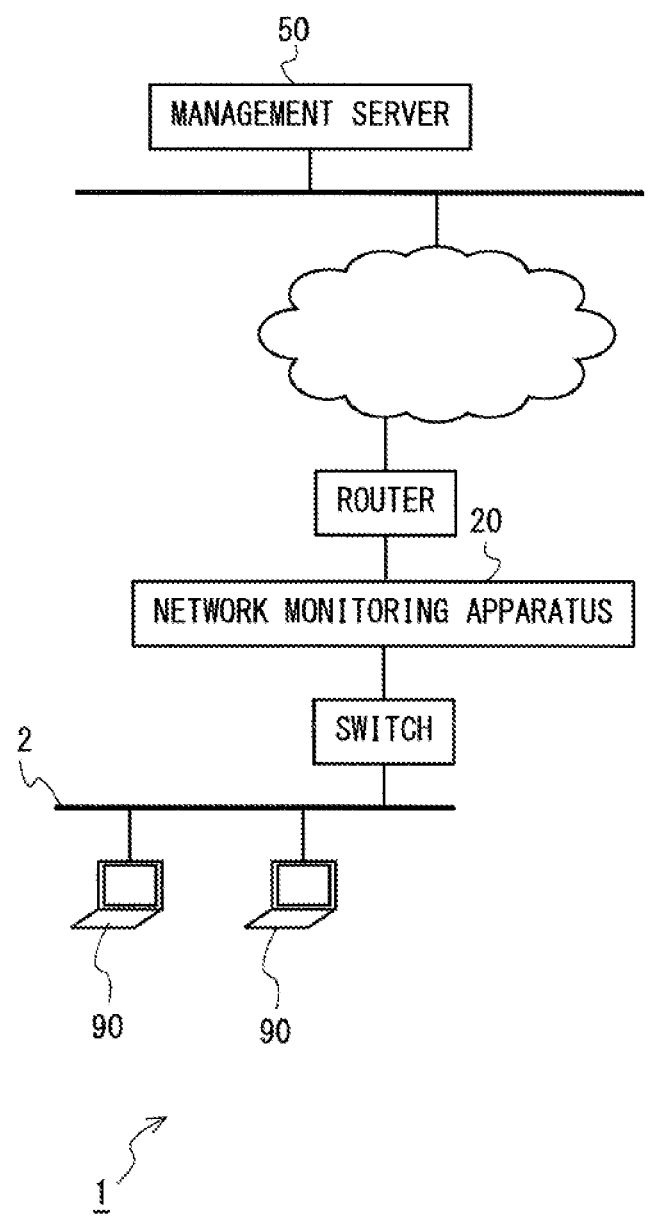
FIG. 12 is a schematic drawing showing a variation of the configuration of a system relating to the embodiment.

For example, even in a case where the network monitoring apparatus 20 is not connected to the monitoring port (mirror port), and is simply connected to a network segment 2, it is possible to acquire the packets and frames, etc. sent and received by the node 90, by acquiring all of the frames flowing through the network segment 2, including those which are not directed to the MAC address of the network monitoring apparatus 20. In this case also, the network monitoring apparatus 20 operates in passive mode. Furthermore, for example, the network monitoring apparatus 20 may acquire passing packets and frames, etc., by being connected between the switch or router of the network segment 2 and another switch or router at a higher level (see FIG. 12). In this case, the network monitoring apparatus 20 operates in an in-line mode where it transfers those acquired packets which do not need to be blocked. Furthermore, the network monitoring apparatus 20 may also be incorporated into the router or switch.

In the present embodiment, a case is described in which packets flowing over a network are acquired and detection is performed in real time by the various detection engines described above, but the scope of the present disclosure is not limited to real-time detection. For example, it is also possible to accumulate data relating to communications flowing over a network, and to carry out processing by the various detection engines described above, on the accumulated data.

What is claimed is:

1. An information processing apparatus, comprising:
   a memory; and
   a processor coupled to the memory, the processor being configured to execute:
      comparing a communication by a terminal connected to a network with a pattern held in advance;
      specifying a phase of activity of the terminal, in accordance with a result of the comparing;
      determining whether or not the terminal is used to conduct unauthorized activity;
      when correlation analysis between a first phase and a second phase is performed and a behavior of traffic observed with the phase transition between the first phase and the second phase at the terminal satisfies a previously established correlation condition, specifying the correlation condition as a type of behavior of the terminal in relation to a first communication and a second communication and storing the correlation condition in association with an identification information of the terminal, the first phase being specified with respect to the first communication of the terminal and the second phase being specified with respect to the second communication of the terminal carried out before or after the first communication; and
      classification which involves classifying unauthorized activity of the terminal by referring to information that indicates correspondences between classifications of unauthorized activity and one or a plurality of the correlation conditions related to the unauthorized activity based on the correlation condition which is satisfied by the correlation analysis between phases in the same terminal and stored with respect to the terminal, when determination is made in the determining that the terminal is used to conduct unauthorized activity.

2. The information processing apparatus according to claim 1, wherein
   the processor further specifies an evaluated value which indicates a degree to which it is inferred that the terminal is used to conduct unauthorized activity, in accordance with a comparison result; and
   the processor determines whether or not the terminal is used to conduct unauthorized activity based on the evaluated value.

3. The information processing apparatus according to claim 2, the processor further executes holding a maximum value of the evaluated value, for each of the phases, and for each terminal, wherein the processor determines whether or not the terminal is used to conduct unauthorized activity based on the maximum value of the evaluated value for each of the phases.

4. The information processing apparatus according to claim 1, wherein
the classification is a classification indicating a degree of danger of an infected malware; and
the classification involves specifying a degree of danger of the malware with which the terminal was infected, based on one or a plurality of the correlation conditions specified for the terminal.

5. The information processing apparatus according to claim 4, wherein the classification involves investigating in order from behavior relating to the highest degree of danger and sets a first matching degree of danger.

6. The information processing apparatus according to claim 1, wherein
the classification is a classification indicating a malware type relating to the unauthorized activity; and
the classification involves specifying a malware type relating to the unauthorized activity of the terminal based on one or a plurality of the correlation conditions specified for the terminal.

7. The information processing apparatus according to claim 1, wherein
the phase indicates a transitional state of unauthorized activity by the terminal; and
the processor specifies, as the phase relating to the communication, a phase previously established with respect to the pattern which is matching or similar to the communication, as a result of the comparison.

8. The information processing apparatus according to claim 1, the processor further executes totalizing maximum values of the evaluated values for each of the phases, and for each terminal, wherein
the processor determines whether or not the terminal is used to conduct unauthorized activity based on a total value obtained by the totalizing.

9. The information processing apparatus according to claim 8, wherein the processor determines that the terminal is used to conduct unauthorized activity, when the total value or a value based on the total value exceeds a prescribed threshold value.

10. The information processing apparatus according to claim 9, wherein the classification involves carrying out classification of the unauthorized activity, when the total value or a value based on the total value is equal to or greater than a prescribed value.

11. The information processing apparatus according to claim 1, the processor further executes acquiring a communication by a terminal connected to the network, wherein
the processor compares the acquired communication with the pattern held in advance.

12. The information processing apparatus according to claim 1, the processor further executes blocking a communication by the terminal when determination is made that the terminal is used to conduct unauthorized activity.

13. A method for classifying unauthorized activity, the method causing a computer to execute:
comparing a communication by a terminal connected to a network with a pattern held in advance;
specifying a phase of activity of the terminal, in accordance with a result of the comparing;
determining whether or not the terminal is used to conduct unauthorized activity;
when correlation analysis between a first phase and a second phase is performed and a behavior of traffic observed with the phase transition between the first phase and the second phase at the terminal satisfies a previously established correlation condition, specifying a type of behavior of the terminal in relation to a first communication and a second communication and storing the correlation condition in association with an identification information of the terminal, the first phase being specified with respect to the first communication of the terminal and the second phase being specified with respect to the second communication of the terminal carried out before or after the first communication; and
classification which involves classifying unauthorized activity of the terminal by referring to information that indicates correspondences between classifications of unauthorized activity and one or a plurality of the correlation conditions related to the unauthorized activity based on the correlation condition which is satisfied by the correlation analysis between phases in the same terminal and stored with respect to the terminal, when determination is made in the determining that the terminal is used to conduct unauthorized activity.

14. A computer-readable non-transitory medium on which is recorded a program for classifying unauthorized activity, the program causing a computer to execute:
comparing a communication by a terminal connected to a network with a pattern held in advance;
specifying a phase of activity of the terminal, in accordance with a result of the comparing;
determining whether or not the terminal is used to conduct unauthorized activity;
when correlation analysis between a first phase and a second phase is performed and a behavior of traffic observed with the phase transition between the first phase and the second phase at the terminal satisfies a previously established correlation condition, specifying the correlation condition as a type of behavior of the terminal in relation to a first communication and a second communication and storing the correlation condition in association with an identification information of the terminal, the first phase being specified with respect to the first communication of the terminal and the second phase being specified with respect to the second communication of the terminal carried out before or after the first communication; and
classification which involves classifying unauthorized activity of the terminal by referring to information that indicates correspondences between classifications of unauthorized activity and one or a plurality of the correlation conditions related to the unauthorized activity based on the correlation condition which is satisfied by the correlation analysis between phases in the same terminal and stored with respect to the terminal, when determination is made in the determining that the terminal is used to conduct unauthorized activity.

* * * * *